US011864029B2

(12) United States Patent
Sakhnini et al.

(10) Patent No.: US 11,864,029 B2
(45) Date of Patent: Jan. 2, 2024

(54) GROUPING BANDWIDTH PARTS FOR EFFICIENT BANDWIDTH PART SWITCHING

(71) Applicant: QUALCOMM Incorporated, San Diego, CA (US)

(72) Inventors: Iyab Issam Sakhnini, San Diego, CA (US); Jun Ma, San Diego, CA (US); Olufunmilola Omolade Awoniyi-Oteri, San Diego, CA (US); Tao Luo, San Diego, CA (US); Yan Zhou, San Diego, CA (US); Wooseok Nam, San Diego, CA (US); Juan Montojo, San Diego, CA (US); Peter Pui Lok Ang, San Diego, CA (US); Jelena Damnjanovic, Del Mar, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 17/223,225

(22) Filed: Apr. 6, 2021

(65) Prior Publication Data

US 2022/0322148 A1  Oct. 6, 2022

(51) Int. Cl.
*H04W 28/20* (2009.01)
*H04W 36/06* (2009.01)
*H04W 72/0453* (2023.01)
*H04W 36/26* (2009.01)
*H04L 5/00* (2006.01)
*H04W 72/27* (2023.01)

(52) U.S. Cl.
CPC .......... *H04W 28/20* (2013.01); *H04L 5/0098* (2013.01); *H04W 36/06* (2013.01); *H04W 36/26* (2013.01); *H04W 72/0453* (2013.01); *H04W 72/27* (2023.01)

(58) Field of Classification Search
CPC ...... H04W 28/20; H04W 72/27; H04L 5/0098
See application file for complete search history.

(56) References Cited

U.S. PATENT DOCUMENTS

2020/0245304 A1* 7/2020 Nam .................. H04L 5/0042
2020/0351738 A1* 11/2020 Huang ................ H04W 36/06

* cited by examiner

*Primary Examiner* — Sulaiman Nooristany
(74) *Attorney, Agent, or Firm* — Holland & Hart LLP

(57) ABSTRACT

Methods, systems, and devices for wireless communications are described. A user equipment (UE) may identify a configuration for a set of bandwidth part groups including an intra-group switching delay and an inter-group switching delay, where the intra-group switching delay is smaller than the inter-group switching delay. The UE may communicate with a base station on a first bandwidth part of a first bandwidth part group of the set of bandwidth part groups. The UE may switch to a second bandwidth part of the first bandwidth part group based at least in part on the intra-group switching delay, or the UE may switch to a third bandwidth part of a second bandwidth part group based at least in part on the inter-group switching delay. The UE may communicate with the base station on the second bandwidth part or the third bandwidth part based on switching.

28 Claims, 23 Drawing Sheets

GROUPING BANDWIDTH PARTS FOR EFFICIENT BANDWIDTH PART SWITCHING

FIELD OF TECHNOLOGY

The following relates generally to wireless communications and more specifically to grouping bandwidth parts for efficient bandwidth part switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station on a bandwidth part of a radio frequency spectrum band. In some cases, the UE may perform a bandwidth part switch to communicate on a different bandwidth part. During the switch, the UE may not be able to communicate with the base station, which may lead to reduced resource utilization. Some techniques for performing a bandwidth part switch can be enhanced to improve resource utilization.

SUMMARY

The described techniques relate to improved methods, systems, devices, and apparatuses that support grouping bandwidth parts (BWPs) for efficient BWP switching. Generally, the described techniques provide for utilizing shorter switching delays when switching between BWPs of a BWP group. A user equipment (UE) may have much faster switching times among certain BWPs. For example, some BWPs may share configurations, or the radio frequency retuning time may be shorter for some switches than others. This may increase the rate at which the UE can switch between these certain BWPs. Therefore, the techniques described herein support grouping BWPs to utilize the shorter BWP switching time. The UE may be scheduled with a BWP hopping pattern to be within the BWP group as much as possible to reduce the switching gaps and improve radio frequency spectrum utilization. The UE may be configured with an intra-group switching delay and an inter-group switching delay, where the intra-group switching delay may be smaller than the inter-group switching delay. Therefore, switches within a BWP group may have a smaller delay, leading to higher utilization. Additional techniques for determining the switching delays and determining BWPs for the BWP groups are described herein. In some cases, the switching delays may be based on UE capability or signaled by the base station. BWPs may be organized into BWP groups based on UE capability, the switching delays, frequency, shared configurations, or a combination thereof.

A method of wireless communications at a UE is described. The method may include identifying a configuration for a set of bandwidth part groups including an intra-group switching delay and an inter-group switching delay, where the intra-group switching delay is smaller than the inter-group switching delay, communicating with a base station on a first bandwidth part of a first bandwidth part group of the set of bandwidth part groups, switching to a second bandwidth part of the first bandwidth part group based on the intra-group switching delay or switching to a third bandwidth part of a second bandwidth part group of the set of bandwidth part groups based on the inter-group switching delay, and communicating with the base station on the second bandwidth part or the third bandwidth part based on the switching.

An apparatus for wireless communications at a UE is described. The apparatus may include at least one processor, memory coupled with the at least one processor, and instructions stored in the memory. The instructions may be executable by the at least one processor to cause the apparatus to identify a configuration for a set of bandwidth part groups including an intra-group switching delay and an inter-group switching delay, where the intra-group switching delay is smaller than the inter-group switching delay, communicate with a base station on a first bandwidth part of a first bandwidth part group of the set of bandwidth part groups, switch to a second bandwidth part of the first bandwidth part group based on the intra-group switching delay or switching to a third bandwidth part of a second bandwidth part group of the set of bandwidth part groups based on the inter-group switching delay, and communicate with the base station on the second bandwidth part or the third bandwidth part based on the switching.

Another apparatus for wireless communications at a UE is described. The apparatus may include means for identifying a configuration for a set of bandwidth part groups including an intra-group switching delay and an inter-group switching delay, where the intra-group switching delay is smaller than the inter-group switching delay, communicating with a base station on a first bandwidth part of a first bandwidth part group of the set of bandwidth part groups, switching to a second bandwidth part of the first bandwidth part group based on the intra-group switching delay or switching to a third bandwidth part of a second bandwidth part group of the set of bandwidth part groups based on the inter-group switching delay, and communicating with the base station on the second bandwidth part or the third bandwidth part based on the switching.

A non-transitory computer-readable medium storing code for wireless communications at a UE is described. The code may include instructions executable by at least one processor to identify a configuration for a set of bandwidth part groups including an intra-group switching delay and an inter-group switching delay, where the intra-group switching delay is smaller than the inter-group switching delay, communicate with a base station on a first bandwidth part of a first bandwidth part group of the set of bandwidth part groups, switch to a second bandwidth part of the first bandwidth part group based on the intra-group switching delay or switching to a third bandwidth part of a second bandwidth part group of the set of bandwidth part groups based on the inter-group switching delay, and communicate with the base station on the second bandwidth part or the third bandwidth part based on the switching.

Some examples of the method, apparatuses, and non-transitory computer-readable medium described herein may further include operations, features, means, or instructions for transmitting a UE capability for bandwidth part switching to the base station.

Some examples of the method, apparatuses, and non-transitory computer-readable medium described herein may further include operations, features, means, or instructions for determining the first bandwidth part group and the second bandwidth part group based on the UE capability.

Some examples of the method, apparatuses, and non-transitory computer-readable medium described herein may further include operations, features, means, or instructions for receiving an indication of the intra-group switching delay from the base station.

Some examples of the method, apparatuses, and non-transitory computer-readable medium described herein may further include operations, features, means, or instructions for determining the first bandwidth part group and the second bandwidth part group based on the indication of the intra-group switching delay.

In some examples of the method, apparatuses, and non-transitory computer-readable medium described herein, the intra-group switching delay may be based on a subcarrier spacing of the first bandwidth part group, a radio frequency spectrum band including the first bandwidth part group, or both.

In some examples of the method, apparatuses, and non-transitory computer-readable medium described herein, the bandwidth parts of the first bandwidth part group may be contiguous in frequency.

In some examples of the method, apparatuses, and non-transitory computer-readable medium described herein, the bandwidth parts of the first bandwidth part group may be non-contiguous in frequency.

In some examples of the method, apparatuses, and non-transitory computer-readable medium described herein, the bandwidth parts of the first bandwidth part group may be configured together by the base station.

Some examples of the method, apparatuses, and non-transitory computer-readable medium described herein may further include operations, features, means, or instructions for receiving a list of bandwidth parts from the base station, selecting a first set of bandwidth parts from the list of bandwidth parts for the first bandwidth part group and a second set of bandwidth parts from the list of bandwidth parts for the second bandwidth part group, and transmitting an indication of the selection for the first bandwidth part group and the second bandwidth part group to the base station.

In some examples of the method, apparatuses, and non-transitory computer-readable medium described herein, the first bandwidth part group includes bandwidth parts in a first hop region, and the second bandwidth part group includes bandwidth parts in a second hop region.

Some examples of the method, apparatuses, and non-transitory computer-readable medium described herein may further include operations, features, means, or instructions for identifying a fourth bandwidth part at least partially overlapping the first hop region and the second hop region.

Some examples of the method, apparatuses, and non-transitory computer-readable medium described herein may further include operations, features, means, or instructions for determining a bandwidth part group for the fourth bandwidth part based on a larger overlap with the first hop region or the second hop region.

Some examples of the method, apparatuses, and non-transitory computer-readable medium described herein may further include operations, features, means, or instructions for receiving, from the base station, an indication of whether the fourth bandwidth part may be included in the first bandwidth part or the second bandwidth part group.

Some examples of the method, apparatuses, and non-transitory computer-readable medium described herein may further include operations, features, means, or instructions for determining the fourth bandwidth part may be not included in a bandwidth part group based on partially overlapping the first hop region and the second hop region, where switching to the fourth bandwidth part may be based on the inter-group switching delay.

Some examples of the method, apparatuses, and non-transitory computer-readable medium described herein may further include operations, features, means, or instructions for receiving signaling from the base station configuring a set of bandwidth parts of the first bandwidth part group, where the set of bandwidth parts may be included in the first bandwidth part group based on the signaling.

A method of wireless communication at a base station is described. The method may include identifying a configuration for a set of bandwidth part groups including an intra-group switching delay and an inter-group switching delay, where the intra-group switching delay is smaller than the inter-group switching delay, communicating with a UE on a first bandwidth part of a first bandwidth part group of the set of bandwidth part groups, switching to a second bandwidth part of the first bandwidth part group based on the intra-group switching delay or switching to a third bandwidth part of a second bandwidth part group of the set of bandwidth part groups based on the inter-group switching delay, and communicating with the UE on the second bandwidth part or the third bandwidth part based on the switching.

An apparatus for wireless communication at a base station is described. The apparatus may include at least one processor, memory coupled with the at least one processor, and instructions stored in the memory. The instructions may be executable by the at least one processor to cause the apparatus to identify a configuration for a set of bandwidth part groups including an intra-group switching delay and an inter-group switching delay, where the intra-group switching delay is smaller than the inter-group switching delay, communicate with a UE on a first bandwidth part of a first bandwidth part group of the set of bandwidth part groups, switch to a second bandwidth part of the first bandwidth part group based on the intra-group switching delay or switching to a third bandwidth part of a second bandwidth part group of the set of bandwidth part groups based on the inter-group switching delay, and communicate with the UE on the second bandwidth part or the third bandwidth part based on the switching.

Another apparatus for wireless communication at a base station is described. The apparatus may include means for identifying a configuration for a set of bandwidth part groups including an intra-group switching delay and an inter-group switching delay, where the intra-group switching delay is smaller than the inter-group switching delay, communicating with a UE on a first bandwidth part of a first bandwidth part group of the set of bandwidth part groups, switching to a second bandwidth part of the first bandwidth part group based on the intra-group switching delay or switching to a third bandwidth part of a second bandwidth part group of the set of bandwidth part groups based on the inter-group switching delay, and communicating with the UE on the second bandwidth part or the third bandwidth part based on the switching.

A non-transitory computer-readable medium storing code for wireless communication at a base station is described. The code may include instructions executable by at least one processor to identify a configuration for a set of bandwidth part groups including an intra-group switching delay and an inter-group switching delay, where the intra-group switching delay is smaller than the inter-group switching delay, communicate with a UE on a first bandwidth part of a first bandwidth part group of the set of bandwidth part groups, switch to a second bandwidth part of the first bandwidth part group based on the intra-group switching delay or switching to a third bandwidth part of a second bandwidth part group of the set of bandwidth part groups based on the inter-group switching delay, and communicate with the UE on the second bandwidth part or the third bandwidth part based on the switching.

Some examples of the method, apparatuses, and non-transitory computer-readable medium described herein may further include operations, features, means, or instructions for receiving a UE capability for bandwidth part switching from the UE.

Some examples of the method, apparatuses, and non-transitory computer-readable medium described herein may further include operations, features, means, or instructions for determining the first bandwidth part group and the second bandwidth part group based on the UE capability.

Some examples of the method, apparatuses, and non-transitory computer-readable medium described herein may further include operations, features, means, or instructions for transmitting an indication of the intra-group switching delay to the UE.

Some examples of the method, apparatuses, and non-transitory computer-readable medium described herein may further include operations, features, means, or instructions for determining the first bandwidth part group and the second bandwidth part group based on the indication of the intra-group switching delay.

In some examples of the method, apparatuses, and non-transitory computer-readable medium described herein, the intra-group switching delay may be based on a subcarrier spacing of the first bandwidth part group, a radio frequency spectrum band including the first bandwidth part group, or both.

In some examples of the method, apparatuses, and non-transitory computer-readable medium described herein, the bandwidth parts of the first bandwidth part group may be contiguous in frequency.

In some examples of the method, apparatuses, and non-transitory computer-readable medium described herein, the bandwidth parts of the first bandwidth part group may be non-contiguous in frequency.

Some examples of the method, apparatuses, and non-transitory computer-readable medium described herein may further include operations, features, means, or instructions for configuring a first set of bandwidth parts for the first bandwidth part group and a second set of bandwidth parts for the second bandwidth part group, and transmitting an indication of the configuration for the first bandwidth part group and the second bandwidth part group to the UE.

Some examples of the method, apparatuses, and non-transitory computer-readable medium described herein may further include operations, features, means, or instructions for transmitting a list of bandwidth parts from the base station, and receiving, from the UE, an indication of bandwidth parts selected from the list of bandwidth parts for the first bandwidth part group and the second bandwidth part group.

In some examples of the method, apparatuses, and non-transitory computer-readable medium described herein, the first bandwidth part group includes bandwidth parts in a first hop region, and the second bandwidth part group includes bandwidth parts in a second hop region.

Some examples of the method, apparatuses, and non-transitory computer-readable medium described herein may further include operations, features, means, or instructions for identifying a fourth bandwidth part at least partially overlapping the first hop region and the second hop region.

Some examples of the method, apparatuses, and non-transitory computer-readable medium described herein may further include operations, features, means, or instructions for determining a bandwidth part group for the fourth bandwidth part based on a larger overlap with the first hop region or the second hop region.

Some examples of the method, apparatuses, and non-transitory computer-readable medium described herein may further include operations, features, means, or instructions for transmitting, to the UE, an indication of whether the fourth bandwidth part may be included in the first bandwidth part or the second bandwidth part group.

Some examples of the method, apparatuses, and non-transitory computer-readable medium described herein may further include operations, features, means, or instructions for determining the fourth bandwidth part may be not included in a bandwidth part group based on partially overlapping the first hop region and the second hop region, where switching to the fourth bandwidth part may be based on the inter-group switching delay.

Some examples of the method, apparatuses, and non-transitory computer-readable medium described herein may further include operations, features, means, or instructions for transmitting signaling to the UE configuring a set of bandwidth parts of the first bandwidth part group, where the set of bandwidth parts may be included in the first bandwidth part group based on the signaling.

A method is described. The method may include defining a first BWP switching gap for a preconfigured BWP switch, the first BWP switching gap being shorter than a second BWP switching gap associated with dynamically configured BWP switching and switching to a new BWP in accordance with the first BWP switching gap.

An apparatus is described. The apparatus may include at least one processor, memory coupled with the at least one processor, and instructions stored in the memory. The instructions may be executable by the at least one processor to cause the apparatus to define a first BWP switching gap for a preconfigured BWP switch, the first BWP switching gap being shorter than a second BWP switching gap associated with dynamically configured BWP switching and switch to a new BWP in accordance with the first BWP switching gap.

Another apparatus is described. The apparatus may include means for defining a first BWP switching gap for a preconfigured BWP switch, the first BWP switching gap being shorter than a second BWP switching gap associated with dynamically configured BWP switching and means for switching to a new BWP in accordance with the first BWP switching gap.

A non-transitory computer-readable medium storing code is described. The code may include instructions executable by a processor to define a first BWP switching gap for a preconfigured BWP switch, the first BWP switching gap being shorter than a second BWP switching gap associated with dynamically configured BWP switching and switch to a new BWP in accordance with the first BWP switching gap.

In some examples of the method, apparatuses, and non-transitory computer-readable medium described herein, the communication device includes a UE and the defining includes reporting by the UE.

In some examples of the method, apparatuses, and non-transitory computer-readable medium described herein, the communication device includes a base station and the defining includes signaling by the base station.

In some examples of the method, apparatuses, and non-transitory computer-readable medium described herein, the first BWP switching gap may be based on a sub-carrier spacing.

In some examples of the method, apparatuses, and non-transitory computer-readable medium described herein, the first BWP switching gap may be based on a frequency band.

In some examples of the method, apparatuses, and non-transitory computer-readable medium described herein, the first BWP switching gap may be based on a pattern associated with the preconfigured BWP switch.

In some examples of the method, apparatuses, and non-transitory computer-readable medium described herein, the first BWP switching gap may be not based on a pattern associated with the preconfigured BWP switch.

Some examples of the method, apparatuses, and non-transitory computer-readable medium described herein may further include operations, features, means, or instructions for communicating in accordance with rules defined for the second BWP switching gap.

DETAILED DESCRIPTION

Figure 1:
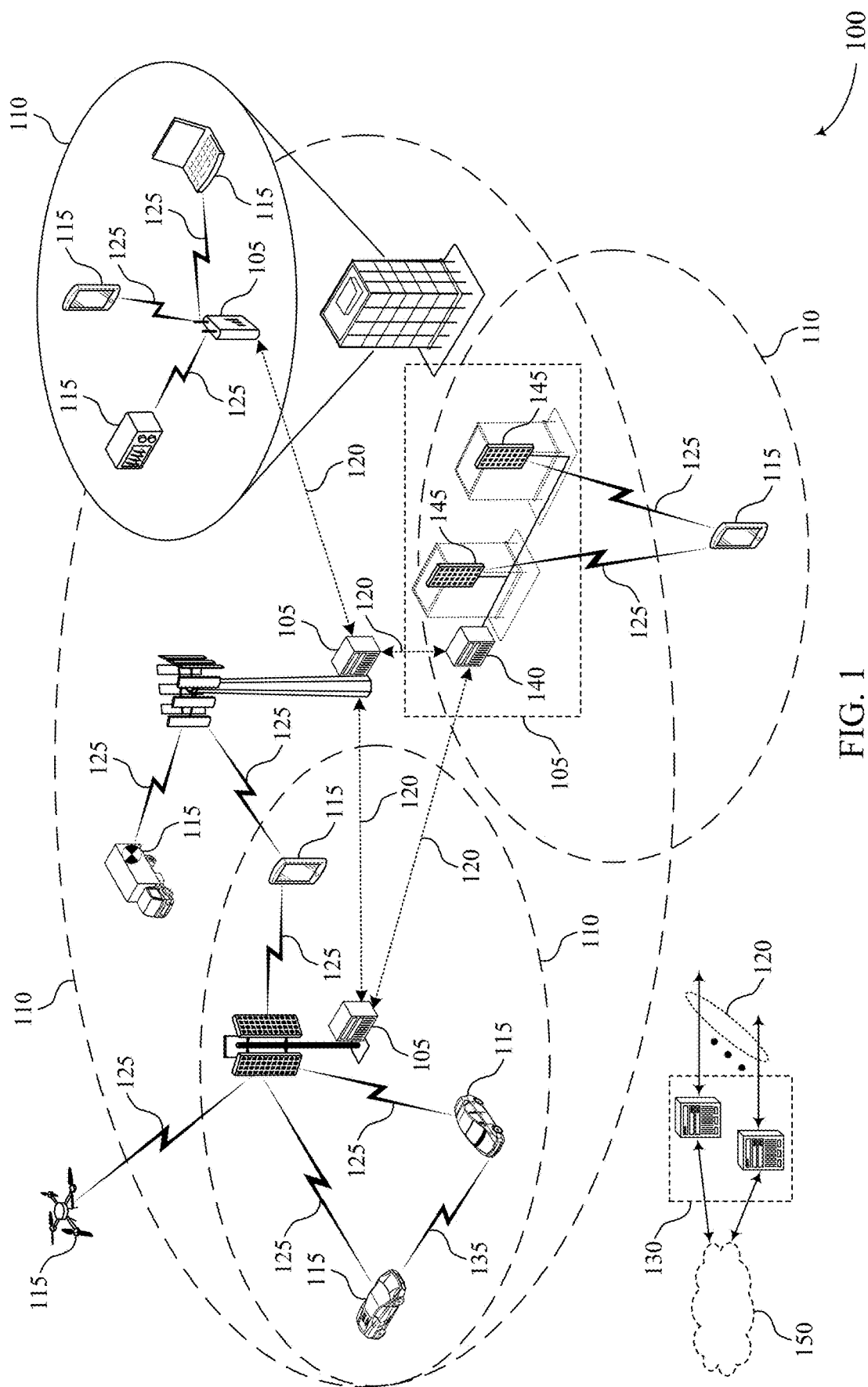
FIG. 1 illustrates an example of a system for wireless communications that supports grouping bandwidth parts (BWPs) for efficient BWP switching in accordance with aspects of the present disclosure.

A base station and a user equipment (UE) may communicate on a radio frequency spectrum band or a part of the radio frequency spectrum band. For example, the UE and the base station may communicate on a bandwidth part (BWP) or subband of the radio frequency spectrum band. In some cases, wireless communications on BWPs may have improved flexibility for resource assignment and increased bandwidth utility and usage. Some wireless communications systems may support BWP switching, or BWP hopping. In some cases, BWP hopping may mitigate performance loss in systems with a reduced bandwidth operation, such as interference introduced in narrowband systems with narrowband BWPs.

In some cases, there may be a gap in communications between the UE communicating on a source BWP and communicating on a target BWP. BWP hopping may reduce utilization of the radio frequency spectrum, as there is a period of time while making the switch where the UE is not communicating. In addition to reducing utilization, these switching gaps may cause scheduling delays for the UE and other UEs. In some cases, how fast a UE can perform a BWP switch may be based on the processing speed or capability of the UE. For some BWP switches, the switching time or switching delay may be based on the UE downlink control information processing time, Modem L1 processing time (e.g., time to re-initialize loops, settling, etc.), and radio frequency (RF) retuning time (e.g., to adjust antenna arrays for the target BWP or subband). In some systems, a UE may report the capability and be configured with a switching time that is assumed by the UE (e.g., to maintain scheduling consistency) for any BWP switch.

However, the UE may be able to have much faster switching times among certain BWPs. For example, some BWPs may share configurations, or the RF retuning time may be shorter for some switches than others. This may increase the rate at which the UE can switch between these certain BWPs, but UEs of other systems assume a same BWP switch time for any BWP switch. Therefore, the techniques described herein support grouping BWPs to utilize a shorter BWP switching time. For example, a set of BWPs may be grouped together when a UE can perform a fast switching between the set of BWPs. The UE may be more frequently scheduled with a BWP hopping pattern to be within the BWP group to more frequently reduce the switching gaps and improve radio frequency spectrum utilization. The UE may be configured with an intra-group switching delay and an inter-group switching delay, where the intra-group switching delay may be smaller than the inter-group switching delay. Therefore, switches within a BWP group may have a smaller delay, leading to higher utilization. Additional techniques for determining the switching delays and determining BWPs for the BWP groups are described herein. In some cases, the switching delays may be based on UE capability or signaled by the base station. The BWPs may be organized into BWP groups based on UE capability, the switching delays, frequency, shared configurations, or a combination thereof.

In some examples, a BWP may indicate a set of contiguous physical resource blocks (PRBs) in the frequency domain configured for a user. Hopping between BWPs or subbands (SBs) may reduce base station interference effects that can affect certain BWPs or SBs. However, hopping reduces utilization of network resources due to BWP/SB switching gaps. In some cases, the BWP/SB switch times and configurations are preconfigured before the switch time. A UE may be able to switch BWPs faster than currently defined times when BWP/SB switches are pre-configured. Accordingly, UEs described herein support a new BWP/SB switching gap is defined to be smaller than the BWP switching delay used in other systems. The new BWP/SB switching gap may apply during preconfigured BWP/SB switching.

Aspects of the disclosure are initially described in the context of wireless communications systems. Aspects of the disclosure are further illustrated by and described with reference to apparatus diagrams, system diagrams, and flowcharts that relate to grouping bandwidth parts for efficient bandwidth part switching.

FIG. 1 illustrates an example of a wireless communications system 100 that supports grouping bandwidth parts for efficient bandwidth part switching in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), etc., and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may have much faster switching times among certain BWPs. For example, some BWPs may share configurations, or the radio frequency retuning time may be shorter for some switches than others. This may increase the rate at which the UE 115 can switch between these certain BWPs. Therefore, the techniques described herein support grouping BWPs to utilize the shorter BWP switching time. The UE 115 may be scheduled with a BWP hopping pattern to be within the BWP group as much as possible to reduce the switching gaps and improve radio frequency spectrum utilization. The UE 115 may be configured with an intra-group switching delay and an inter-group switching delay, where the intra-group switching delay may be smaller than an inter-group switching delay. Therefore, switches within a BWP group may have a smaller delay, leading to higher utilization. Additional techniques for determining the switching delays and determining BWPs for the BWP groups are described herein. In some cases, the switching delays may be based on UE 115 capability or signaled by the base station. BWPs may be grouped into BWP groups be based on UE capability, the switching delays, frequency, shared configurations, or a combination thereof.

Figure 2:
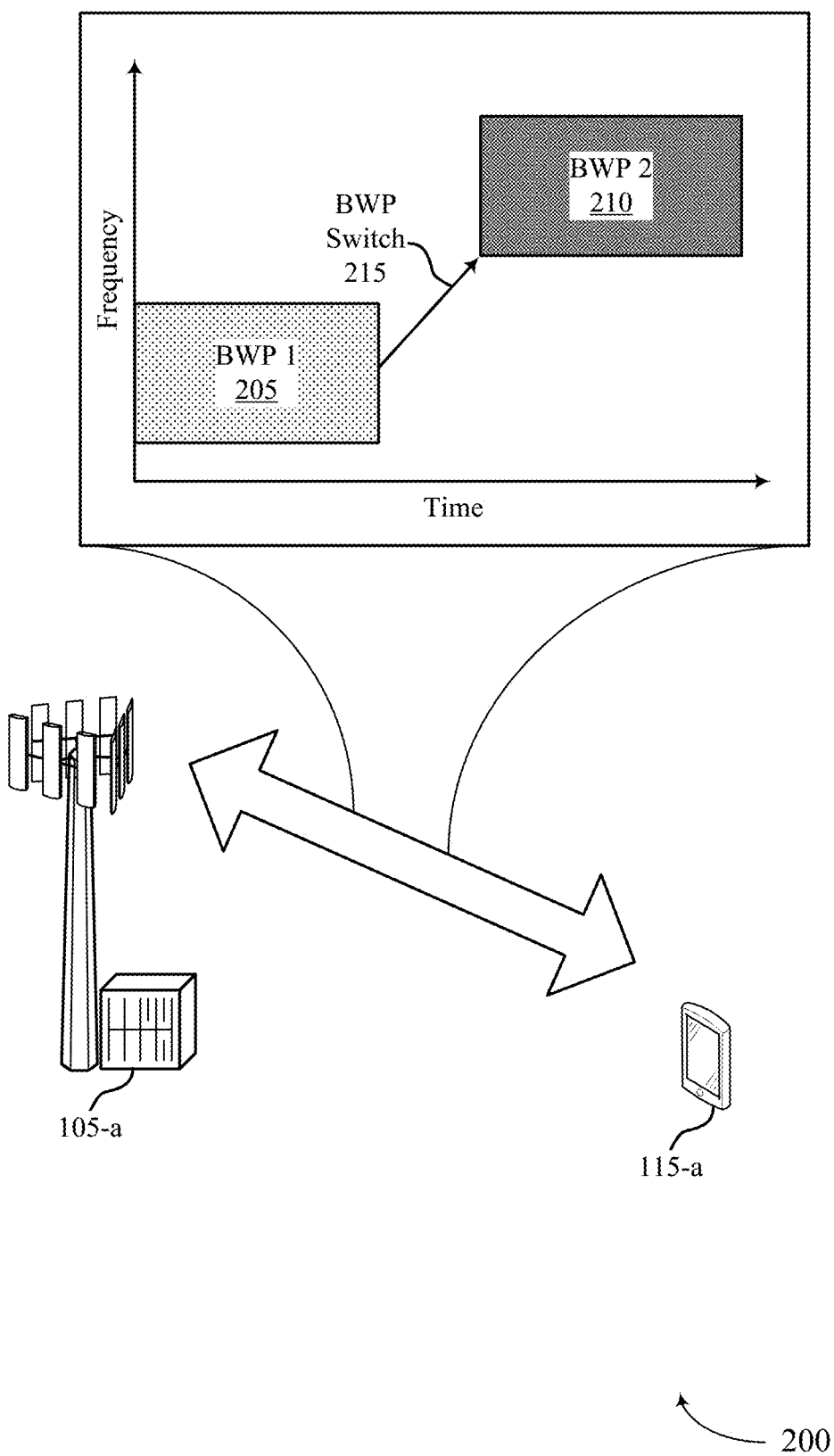
FIG. 2 illustrates an example of a wireless communications system that supports grouping BWPs for efficient BWP switching in accordance with aspects of the present disclosure.

FIG. 2 illustrates an example of a wireless communications system 200 that supports grouping bandwidth parts for efficient bandwidth part switching in accordance with aspects of the present disclosure. In some examples, the wireless communications system 200 may implement aspects of wireless communications system 100. The wireless communications system 200 may include UE 115-a and base station 105-a, which may be respective examples of a UE 115 and a base station 105 described with reference to FIG. 1.

Base station 105-a and UE 115-a may communicate on a radio frequency spectrum band or a part of the radio frequency spectrum band. For example, UE 115-a and base station 105-a may communicate on a first BWP 205. In some cases, wireless communications systems supporting wireless communications on BWPs may have improved flexibility for resource assignment and increase bandwidth utility and usage. In some cases, BWPs of the wireless communications system (e.g., the first BWP 205) may be an example of a narrowband BWP.

The wireless communications system 200 may support BWP switching, or BWP hopping. For example, UE 115-a may switch from communicating on the first BWP 205 to communicating on a second BWP 210, which may be referred to as a BWP hop. In some cases, BWP hopping may mitigate performance loss due to a reduced bandwidth operation. For example, BWP hopping, and subband hopping, may reduce narrowband interference effects.

In some cases, switching BWPs may lead to a gap in communications between communicating on a source BWP and communicating on a target BWP. The switching gap may reduce utilization of the radio frequency spectrum. For example, UE 115-a may switch from the first BWP 205 to the second BWP 210, and there may be a moment between where the UE 115-a is not utilizing the radio frequency spectrum on either BWP. In addition to reducing utilization, switching gaps may be long (e.g., 1-3 milliseconds) and may cause scheduling delays in the wireless communications system.

In some systems, a UE 115 may send a capability of how fast the UE 115 can perform BWP switches. For example, how fast the UE 115 can perform a BWP switch may be based on the processing speed of the UE 115. For BWP switches indicated, or triggered, by downlink control information, the switching time or switching gap may be mainly based on the UE downlink control information processing time, modem L1 processing time (e.g., time to re-initialize loops, settling, etc.), and RF retuning time (e.g., to adjust antenna arrays for the target BWP or subband). In some systems, the UE 115 may report the capability, and the UE 115 may be configured with a switching time that is assumed by the UE 115 (e.g., to maintain scheduling consistency) for any BWP switch.

In some cases, UE 115-a may be able to have much faster switching times among certain BWPs. In some cases, the BWP and subband switch times and configurations may already be configured before the switch. For example, the BWP hopping pattern may already be configured. This may reduce the amount of time that UE 115-a spends on processing the downlink control information, as UE 115-a may already have the configuration for the hopping pattern. Therefore, UE 115-a may be able to perform a faster BWP switch. Similarly, if a single BWP or subband configuration is used for all of the hops, UE 115-a may be able to reduce the Modem L1 processing times, further leading to a reduced switching time. In some cases, switching between some BWPs may take less time for RF retuning, which may also lead to a faster switch time for UE 115-a.

The techniques described herein support grouping BWPs to utilize a shorter BWP switching time. For example, a set of BWPs may be grouped together when a UE 115 can perform a fast switching between the set of BWPs. The UE 115 may be scheduled with a BWP hopping pattern to be within the BWP group more frequently (e.g., as much as possible when performing a BWP switch) to reduce the switching gaps and improve radio frequency spectrum utilization.

UE 115-a may be configured with one or more BWP groups switch times for intra-group switches and inter-group switches. For example, an intra-group switching delay may be smaller than an inter-group switching delay. Therefore, switches within a BWP group may have a smaller delay, leading to higher utilization. UE 115-a may be scheduled for more intra-group BWP hops to improve utilization and reduce the amount of time spent switching BWPs. UE 115-*a* may use the inter-group switching delay when switching BWPs of different groups. In some cases, the inter-group switching delay may be similar to the BWP switching time that is used in other systems for all BWP switches.

In some cases, the BWP groups, intra-group switching delay, or both, may be reported by UE 115-*a* as part of reporting UE capability. In some cases, the BWP groups, intra-group switching delay, or both, may be signaled by base station 105-*a*. In some cases, UE 115-*a* and base station 105-*a* may be pre-configured with the BWP groups, intra-group switching delay, or both, and the configuration may be stored in memory at the devices. In some cases, the intra-group switching delay may be based on subcarrier spacing. For example, BWPs with different subcarrier spacings may have different intra-group switching delays. In some cases, the intra-group switching delay may be based on a radio frequency spectrum band including the BWPs.

In some cases, BWP grouping may be based on frequency or configuration. For example, the BWPs belonging to a BWP group may be contiguous in frequency. In some cases, BWPs in close proximity in the frequency domain may correspond to less time for RF retuning, which may enable the shorter switching delay. In other examples, BWPs in a BWP group may be separated (e.g., non-contiguous) in frequency. In some cases, BWPs or subbands sharing some configuration may be long to a same group. For example, if two BWPs have similar configurations, UE 115-*a* may reduce time spent decoding downlink control information (e.g., by assuming or determining at least a partially common configuration), which may correspond to a shortened switching time. Therefore, UE 115-*a* may be able to switch between BWPs with similar configurations within the intra-group switching delay, so these BWPs with similar configurations may be grouped together.

In some cases, the BWP groups may be defined by UE 115-*a*, by base station 105-*a* and the network, or pre-configured. For example, base station 105-*a* may send UE 115-*a* an explicit list of available BWPs, and UE 115-*a* may select BWPs from the list for BWP groups and indicate the BWP groups to base station 105-*a*. In some cases, UE 115-*a* may indicate the selected BWPs when reporting UE capability. In some cases, the groups may be defined implicitly based on signaled or specified rules. For example, if BWPs share some configuration, then the BWPs may be considered to be in the same group. For example, UE 115-*a* may not receive an explicit indication that BWPs are grouped together but based on the BWPs at least partially having a common configuration, UE 115-*a* may use the intra-group switching delay when switching between the BWPs. Similarly, BWPs in a similar hopping region may be implicitly determined to be in the same BWP group and use the intra-group switching delay.

In some cases, the BWP groups may be based on frequency. For example, the groups may be defined based on a start and end in resource block index or frequency. In some cases, a frequency range for a BWP group may be referred to as a hop region. BWPs within a hop region may be grouped together. In some cases, BWPs in a similar hopping region may be implicitly determined to be in the same BWP group and use the intra-group switching delay. In some cases, BWPs in a hopping region may be explicitly indicated to be in a BWP group.

In some cases, a BWP or subband may overlap two hop regions. In some cases, the BWP or subband may have a larger overlap with one of the hop regions, and the BWP may belong to the hop region with the larger overlap. In some cases, the network (e.g., base station 105-*a*) and UE 115-*a* may treat the BWP overlapping both regions as though it does not belong to any BWP group. In some cases, UE 115-*a* may use the inter-group switching delay when switching to the BWP overlapping both regions. In some cases, base station 105-*a* may signal to UE 115-*a* for how UE 115-*a* is to treat the BWP overlapping both regions. In some cases, UE 115-*a* and base station 105-*a* may be pre-configured with a rule for determining a BWP group for the overlapping BWP.

Figure 3:
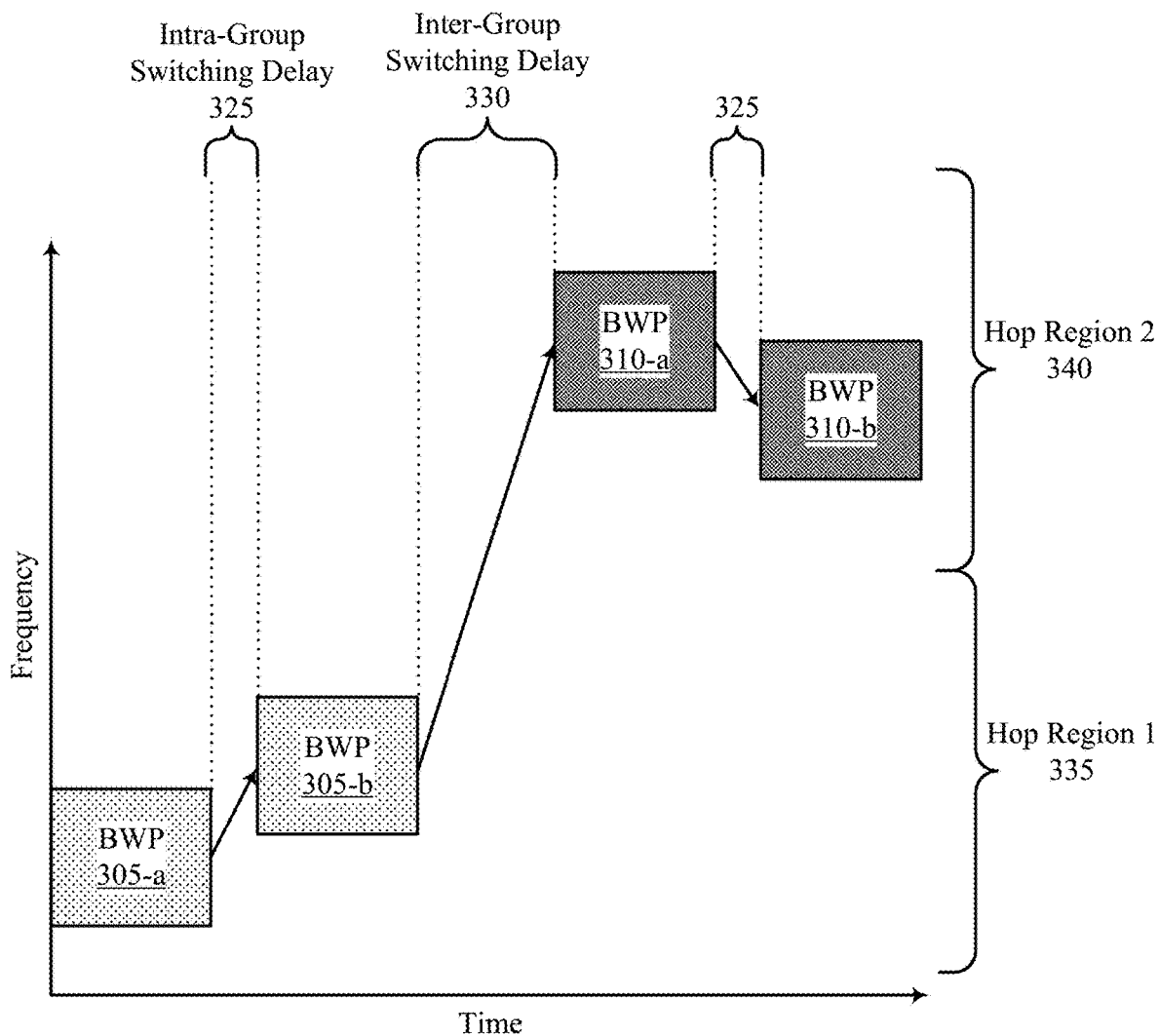
FIG. 3 illustrates an example of a BWP group configuration that supports grouping BWPs for efficient BWP switching in accordance with aspects of the present disclosure.
Figure 3:
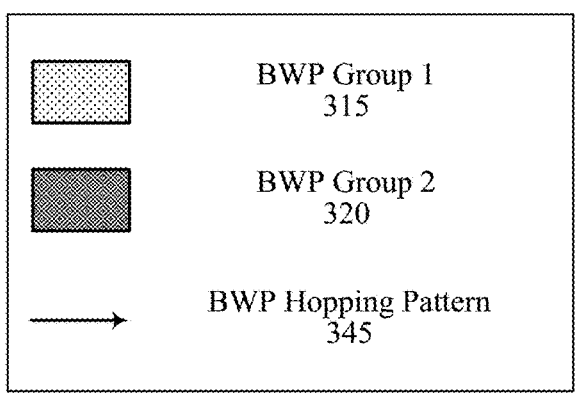

FIG. 3 illustrates an example of a BWP group configuration 300 that supports grouping bandwidth parts for efficient bandwidth part switching in accordance with aspects of the present disclosure. In some examples, the BWP group configuration 300 may implement aspects of wireless communications system 100.

In an example, a UE 115 may be configured with two or more BWP groups to communicate with a base station 105. For example, the UE 115 may be configured with a first BWP group 315 and a second BWP group 320. The first BWP group 315 may include BWPs 305-*a* and 305-*b*, and the second BWP group may include BWPs 310-*a* and 310-*b*.

In some cases, the UE 115 may communicate with the base station 105 using BWP 305-*a* of the first BWP group 315. In some cases, the UE 115 may be triggered to switch to BWP 305-*b*. Because BWP 305-*a* and BWP 305-*b* are both included in the first BWP group 315, the UE 115 may switch from BWP 305-*a* to BWP 305-*b* within an intra-group switching delay 325.

In some cases, the UE 115 may be indicated to switch to BWP 310-*a* from BWP 305-*b*. BWP 310-*a* may be included in the second BWP group 320, while BWP 305-*b* is included in the first BWP group 315. Therefore, the UE 115 may perform the switch according to the inter-group switching delay 330. The inter-group switching delay 330 may be longer than the intra-group switching delay 325. In some examples, the UE 115 may also perform intra-group switches between BWPs 310 of the second BWP group 320 according to the intra-group switching delay 325.

In some cases, the first BWP group 315 may correspond to a first hop region 335, and the second BWP group 320 may correspond to a second hop region 340. For example, BWPs 305 within, or mostly overlapping, the first hop region 335 may be grouped together (e.g., for the first BWP group 315). Similarly, BWPs 310 within, or mostly overlapping, the second hop region 340 may be grouped together (e.g., for the second BWP group 320).

In some cases, the UE 115 may be configured with a BWP hopping pattern 345. The BWP hopping pattern may be configured such that the UE 115 performs intra-group BWP switches to improve radio frequency spectrum utilization. For example, instead of performing many switches from the first BWP group 315 to the second BWP group 320, the UE 115 may perform BWP switches within the groups and more rarely perform switches between the groups.

Figure 4:
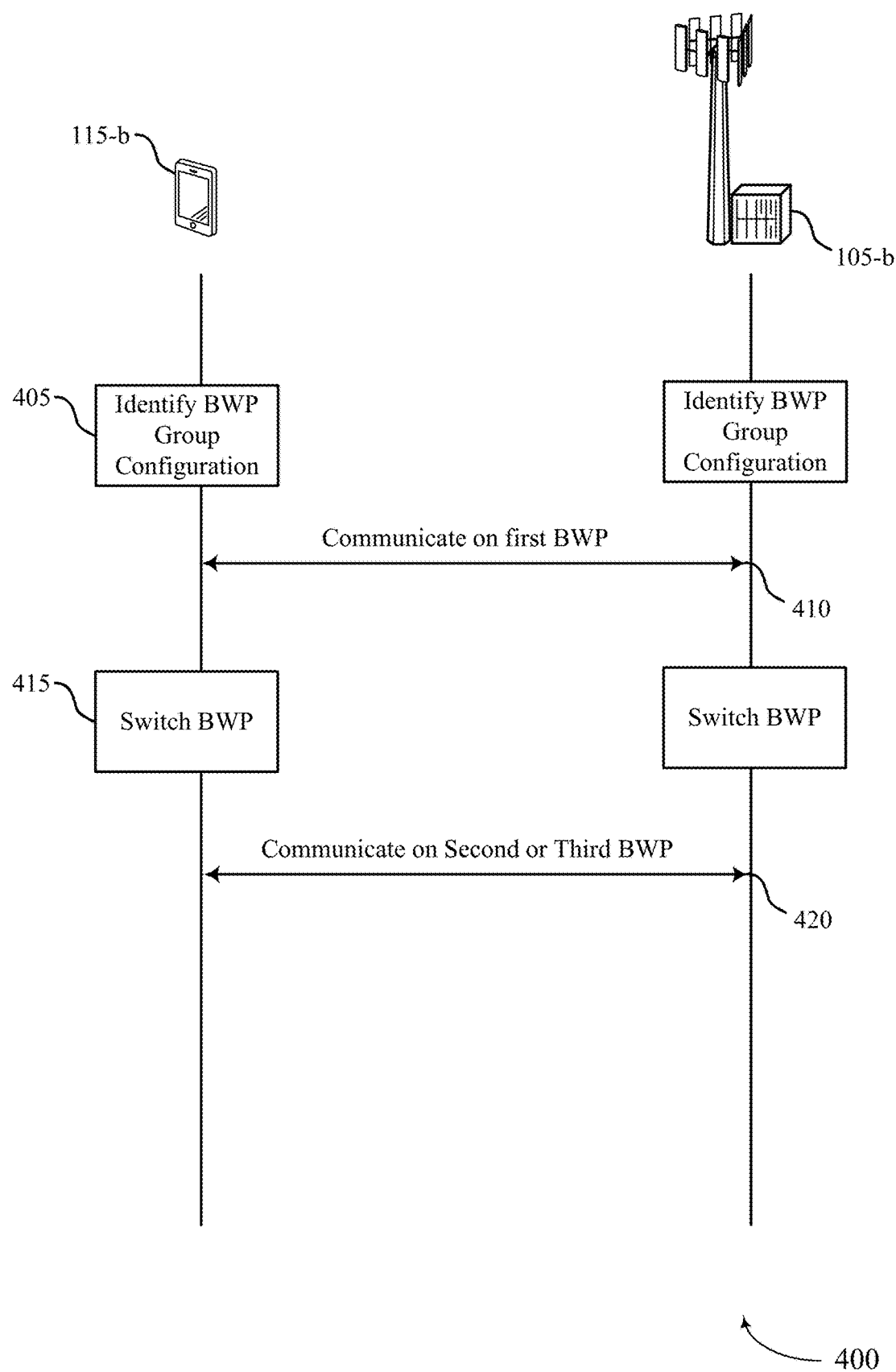
FIG. 4 illustrates an example of a process flow that supports grouping BWPs for efficient BWP switching in accordance with aspects of the present disclosure.

FIG. 4 illustrates an example of a process flow 400 that supports grouping bandwidth parts for efficient bandwidth part switching in accordance with aspects of the present disclosure. In some examples, the process flow 400 may implement aspects of wireless communications system 100. The process flow 400 may include UE 115-*b* and base station 105-*b*, which may be respective examples of a UE 115 and a base station 105 described with reference to FIGS. 1 and 2.

UE 115-*b* may communicate with base station 105-*b* on a BWP or a subband. In some cases, UE 115-*b* may switch the BWP or subband to communicate with base station 105-*b* on a different BWP or subband. In some cases, BWP switching may mitigate interference, but BWP switching may also reduce radio frequency spectrum utilization, as UE 115-*b* may not communicate while switching between BWPs. To improve resource utilization, UE 115-*b* may implement techniques described herein for grouping BWPs and using a shorter switching delay for grouped BWPs.

At 405, UE 115-*b* may identify a configuration for a set of BWP groups including an intra-group switching delay and an inter-group switching delay, where the intra-group switching delay is smaller than the inter-group switching delay. For example, the intra-group switching delay may be the configured switching delay for UE 115-*b* to switch from one BWP of a BWP group to another BWP of the BWP group. The inter-group switching delay may be the configured switching time for UE 115-*b* to switch between BWPs of different groups. Base station 105-*b* may also identify the configuration for the set of BWP groups including the intra-group switching delay and the inter-group switching delay.

In some cases, UE 115-*b* may receive an indication of the intra-group switching delay from base station 105-*b*. In some cases, UE 115-*b* may receive an indication of the BWP groups. In some cases, UE 115-*b* may identify the BWPs for the BWP groups based on the intra-group switching delay. In some examples, base station 105-*b* may indicate a set of BWPs to UE 115-*b*. UE 115-*b* may select BWPs from the indicated set of BWPs for the BWP groups and transmit an indication of the selection for the BWP groups to base station 105-*b*. In some cases, the set of BWPs may be indicated in a list, or a configuration, a field, etc.

In some examples, UE 115-*b* may transmit a UE capability for bandwidth part switching to base station 105-*b*. In some cases, UE 115-*b*, and base station 105-*b*, may determine the BWP groups based on the UE capability. In some cases, UE 115-*b* may determine the BWP groups based on the UE capability and indicate the determined BWP groups to base station 105-*b*.

In some examples, the BWP groups may be based on BWPs with a common configuration. For example, base station 105-*b* may configure a set of BWPs together (e.g., in a single configuration), which may be an implicit indicator that the set of BWPs are included in a BWP group. Additionally, or alternatively, UE 115-*b* may determine that one or more BWPs have at least a partially common configuration, and UE 115-*b* may determine that the one or more BWPs may be included in a BWP group based on the partially common configuration. BWP groups configured based on common configurations may be implicitly determined or explicitly indicated (e.g., by UE 115-*b* or base station 105-*b*). In some cases, switching between BWPs with an at least partially common configuration may take less time, and therefore support the shorter, intra-group switching delay, based on UE 115-*b* spending less time to decode DCI or determine Modem L1 configurations to perform the switch, as UE 115-*b* may already be configured with the DCI or configuration.

In some cases, BWP groups may be based on frequency. For example, BWPs in a similar frequency region, or hop region, may be grouped together. In some cases, a hop region correspond to a range of resource blocks in the frequency domain. In some cases, the hop region may include a starting resource block index and an ending resource block index. BWPs configured between the starting resource block index and the ending resource block index may be grouped together. If a BWP overlaps two different hopping regions, the BWP may either belong to the hopping region with the larger overlap, or the BWP may not be treated as in either hopping region, or the network (e.g., base station 105-*b*) may determine the hopping region for the BWP, or the BWP may be determined to belong to one or more of the hopping regions based on a configuration or rule.

At 410, UE 115-*b* and base station 105-*b* may communicate on a first BWP of a first BWP group of the set of BWP groups. In some cases, UE 115-*b* may be configured with the BWP groups, intra-group switching delay, and inter-group switching delay before communicating with base station 105-*b* on the first BWP, or UE 115-*b* may be configured with the delays and BWP groups after communicating with base station 105-*b* on the first BWP. For example, the switching delays and BWP groups may be configured via RRC, indicated by system information (e.g., in a SIB), or indicated in downlink control information. In some cases, UE 115-*b* may identify the BWP groups and switching delays based on a configuration at UE 115-*b* (e.g., separately of signaling from base station 105-*b*).

At 415, UE 115-*b*, and base station 105-*b*, may switch BWPs. For example, UE 115-*b* may a second BWP of the first BWP group based on the intra-group switching delay, or UE 115-*b* may switch to a third BWP of a second BWP group based on the inter-group switching delay. At 420, UE 115-*b* may communicate with base station 105-*b* on the second BWP or the third BWP based on the BWP switching.

Figure 5:
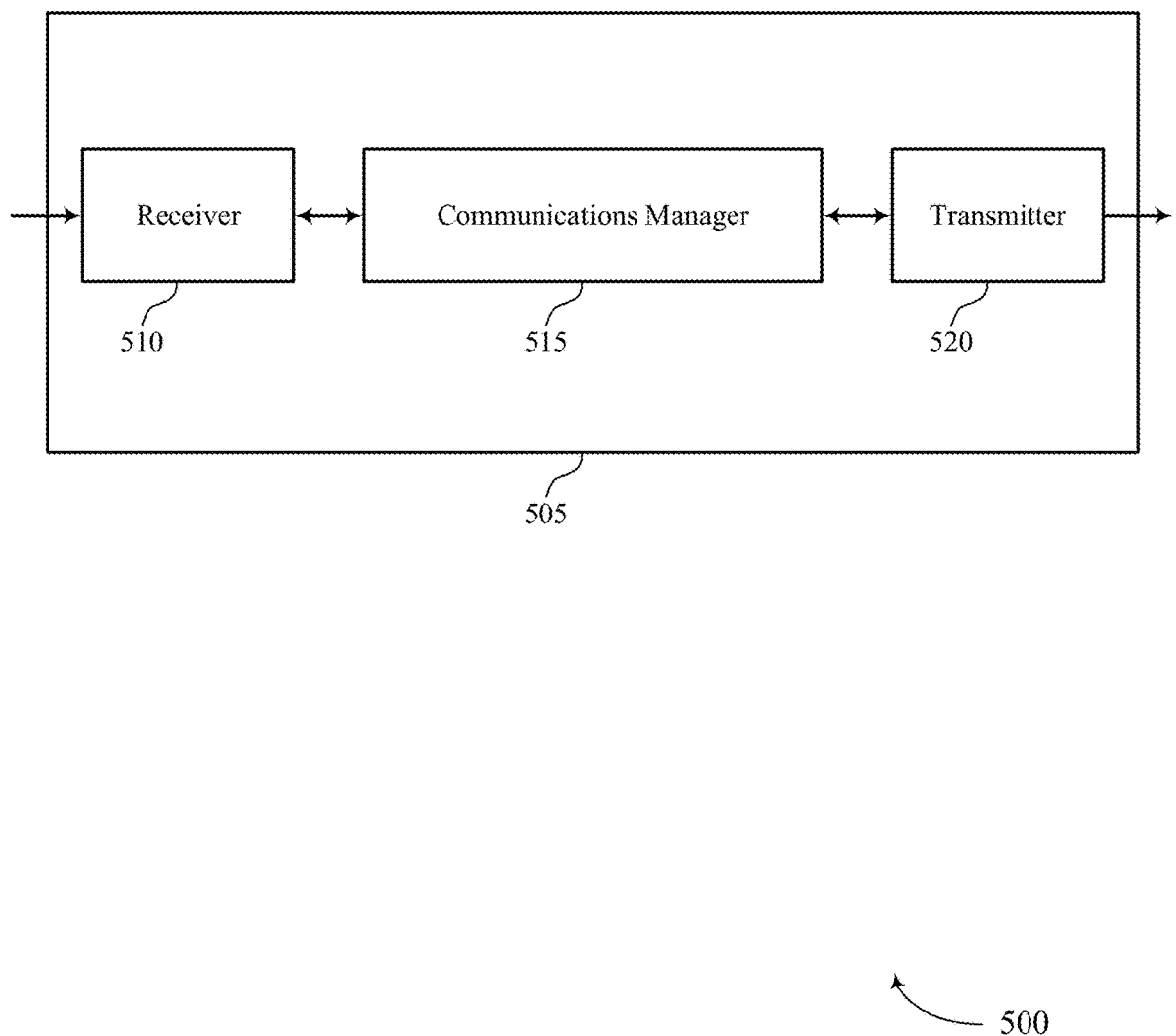
FIGS. 5 and 6 show block diagrams of devices that support grouping BWPs for efficient BWP switching in accordance with aspects of the present disclosure.

FIG. 5 shows a block diagram 500 of a device 505 that supports grouping bandwidth parts for efficient bandwidth part switching in accordance with aspects of the present disclosure. The device 505 may be an example of aspects of a UE 115 as described herein. The device 505 may include a receiver 510, a communications manager 515, and a transmitter 520. The device 505 may also include at least one processor. Each of these components may be in communication with one another (e.g., via one or more buses).

The receiver 510 may receive information such as packets, user data, or control information associated with various information channels (e.g., control channels, data channels, and information related to grouping bandwidth parts for efficient bandwidth part switching, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a configuration for a set of bandwidth part groups including an intra-group switching delay and an inter-group switching delay, where the intra-group switching delay is smaller than the inter-group switching delay, communicate with a base station on a first bandwidth part of a first bandwidth part group of the set of bandwidth part groups, communicate with the base station on the second bandwidth part or the third bandwidth part based on switching, and switch to a second bandwidth part of the first bandwidth part group based on the intra-group switching delay or switching to a third bandwidth part of a second bandwidth part group of the set of bandwidth part groups based on the inter-group switching delay. The communications manager 515 may be an example of aspects of the communications manager 810 described herein.

The communications manager 515, or its sub-components, may be implemented in hardware, code (e.g., software or firmware) executed by at least one processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 515 as described herein may be implemented to realize one or more potential advantages. One implementation may allow a UE 115 to increase throughput by improving resource utilization. By reducing the amount of time switching between BWPs, the UE 115 may be able to improve throughput, as resources may be used for communications instead of switching. Additionally, or alternatively, the UE 115 may further reduce scheduling delays for the UE 115 and other UEs 115. For example, while the UE 115 is switching between BWPs, the UE 115 may not be able to be scheduled, and other UEs 115 may not be able to be scheduled for the BWPs involved in the switch. Therefore, implementing these techniques may also improve network throughput and resource utilization.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
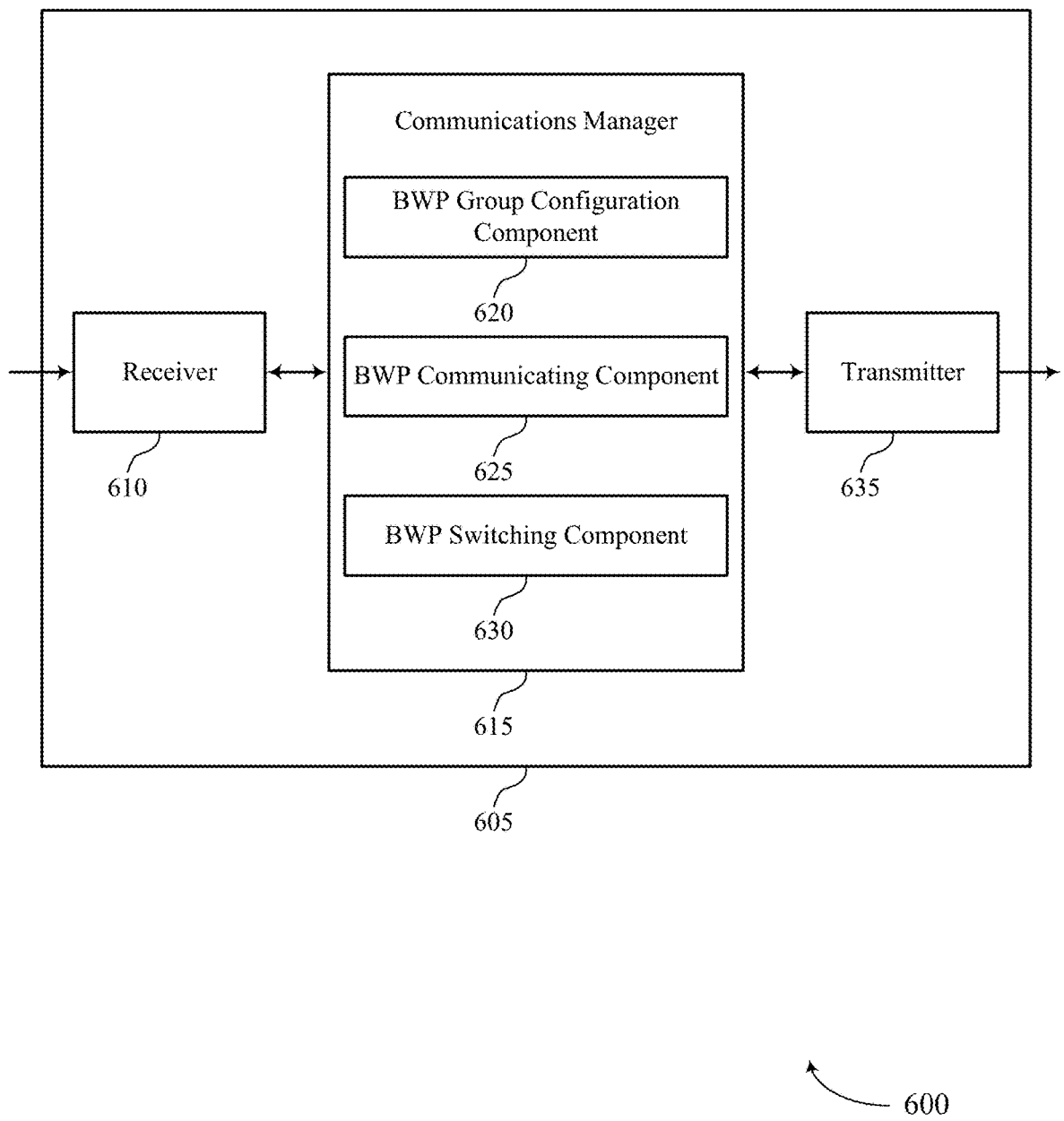

FIG. 6 shows a block diagram 600 of a device 605 that supports grouping bandwidth parts for efficient bandwidth part switching in accordance with aspects of the present disclosure. The device 605 may be an example of aspects of a device 505, or a UE 115 as described herein. The device 605 may include a receiver 610, a communications manager 615, and a transmitter 635. The device 605 may also include at least one processor. Each of these components may be in communication with one another (e.g., via one or more buses).

The receiver 610 may receive information such as packets, user data, or control information associated with various information channels (e.g., control channels, data channels, and information related to grouping bandwidth parts for efficient bandwidth part switching, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a BWP group configuration component 620, a BWP communicating component 625, and a BWP switching component 630. The communications manager 615 may be an example of aspects of the communications manager 810 described herein.

The BWP group configuration component 620 may identify a configuration for a set of bandwidth part groups including an intra-group switching delay and an inter-group switching delay, where the intra-group switching delay is smaller than the inter-group switching delay.

The BWP communicating component 625 may communicate with a base station on a first bandwidth part of a first bandwidth part group of the set of bandwidth part groups and communicate with the base station on the second bandwidth part or the third bandwidth part based on switching.

The BWP switching component 630 may switch to a second bandwidth part of the first bandwidth part group based on the intra-group switching delay or switching to a third bandwidth part of a second bandwidth part group of the set of bandwidth part groups based on the inter-group switching delay.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Based on utilizing different switching delays, at least one processor of a UE 115 (e.g., controlling the receiver 610, the transmitter 635, or the transceiver 820 as described with reference to FIG. 8) may efficiently adjust RF configuration, feedback and power loops, configurations, or a combination thereof, to perform a bandwidth switch with a shortened switching delay. For example, if the UE 115 is switching to a target BWP that is close in frequency to a source BWP, the processor may make small adjustments to an antenna array of the UE 115 to communicate on the target BWP. This may enable a shortened BWP switch delay, and the source BWP and the target BWP may be included in a BWP group. This may enable the UE 115 to have higher resource utilization and begin communicating on the target BWP in a shorter amount of time.

Figure 7:
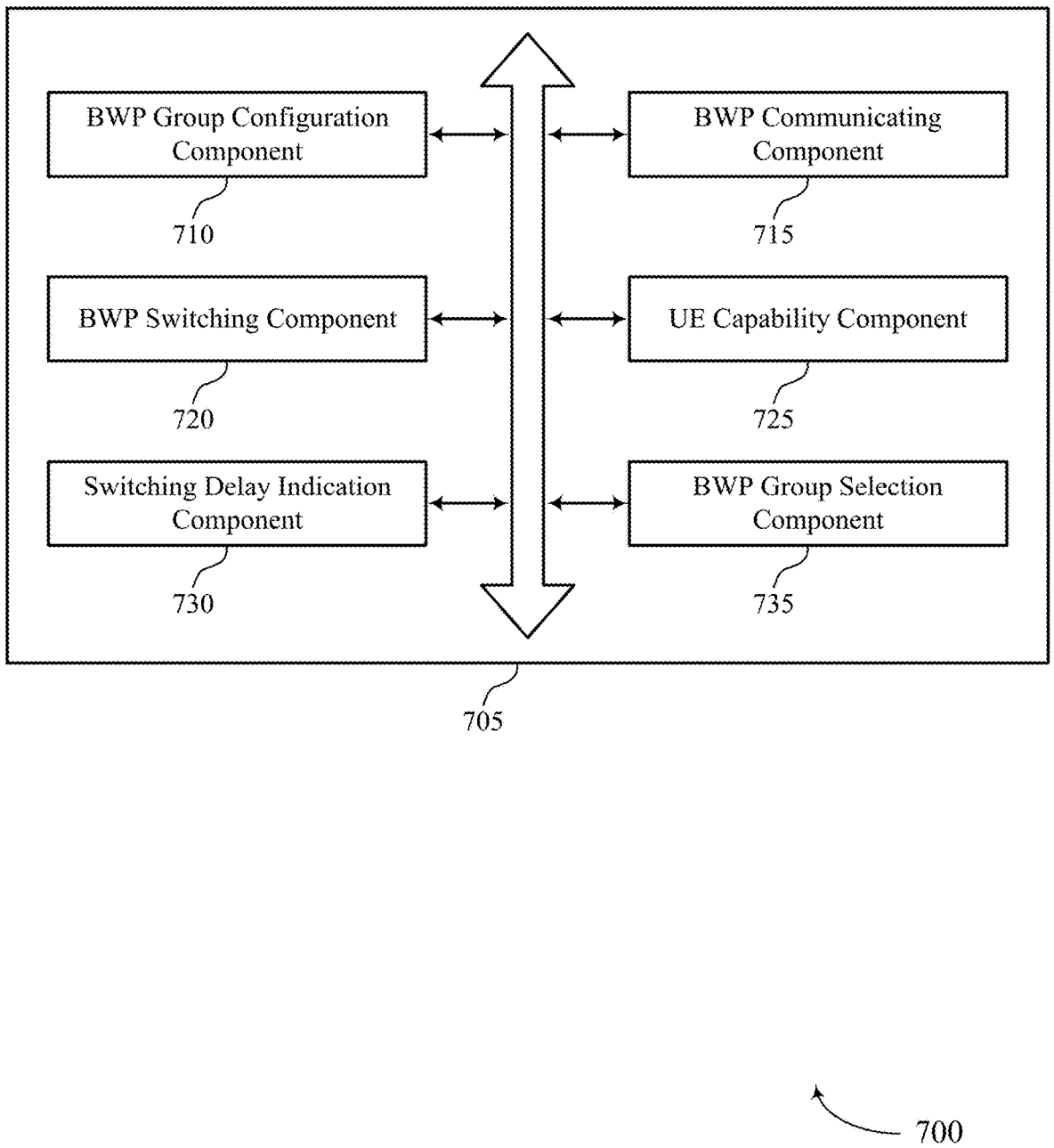
FIG. 7 shows a block diagram of a communications manager that supports grouping BWPs for efficient BWP switching in accordance with aspects of the present disclosure.

FIG. 7 shows a block diagram 700 of a communications manager 705 that supports grouping bandwidth parts for efficient bandwidth part switching in accordance with aspects of the present disclosure. The communications manager 705 may be an example of aspects of a communications manager 515, a communications manager 615, or a communications manager 810 described herein. The communications manager 705 may include a BWP group configuration component 710, a BWP communicating component 715, a BWP switching component 720, an UE capability component 725, a switching delay indication component 730, and a BWP group selection component 735. Each of these modules may communicate, directly or indirectly, with one another (e.g., via one or more buses).

The BWP group configuration component 710 may identify a configuration for a set of bandwidth part groups including an intra-group switching delay and an inter-group switching delay, where the intra-group switching delay is smaller than the inter-group switching delay. In some examples, the bandwidth parts of the first bandwidth part group may be contiguous in frequency. In some examples, the bandwidth parts of the first bandwidth part group may be non-contiguous in frequency.

In some examples, the bandwidth parts of the first bandwidth part group may be configured together by the base station. In some examples, the BWP group configuration component 710 may identify a fourth bandwidth part at least partially overlapping the first hop region and the second hop region.

In some examples, the BWP group configuration component 710 may determine a bandwidth part group for the fourth bandwidth part based on a larger overlap with the first hop region or the second hop region. In some examples, the BWP group configuration component 710 may receive, from the base station, an indication of whether the fourth bandwidth part is included in the first bandwidth part or the second bandwidth part group.

In some examples, the BWP group configuration component 710 may determine the fourth bandwidth part is not included in a bandwidth part group based on partially overlapping the first hop region and the second hop region, where switching to the fourth bandwidth part is based on the inter-group switching delay. In some examples, the BWP group configuration component 710 may receive signaling from the base station configuring a set of bandwidth parts of the first bandwidth part group, where the set of bandwidth parts are included in the first bandwidth part group based on the signaling. In some cases, the intra-group switching delay is based on a subcarrier spacing of the first bandwidth part group, a radio frequency spectrum band including the first bandwidth part group, or both.

In some cases, the first bandwidth part group includes bandwidth parts in a first hop region. In some cases, the second bandwidth part group includes bandwidth parts in a second hop region.

The BWP communicating component 715 may communicate with a base station on a first bandwidth part of a first bandwidth part group of the set of bandwidth part groups. In some examples, the BWP communicating component 715 may communicate with the base station on the second bandwidth part or the third bandwidth part based on switching.

The BWP switching component 720 may switch to a second bandwidth part of the first bandwidth part group based on the intra-group switching delay or switching to a third bandwidth part of a second bandwidth part group of the set of bandwidth part groups based on the inter-group switching delay. The UE capability component 725 may transmit a UE capability for bandwidth part switching to the base station. In some examples, the UE capability component 725 may determine the first bandwidth part group and the second bandwidth part group based on the UE capability.

The switching delay indication component 730 may receive an indication of the intra-group switching delay from the base station. In some examples, the switching delay indication component 730 may determine the first bandwidth part group and the second bandwidth part group based on the indication of the intra-group switching delay.

The BWP group selection component 735 may receive a list of bandwidth parts from the base station. In some examples, the BWP group selection component 735 may select a first set of bandwidth parts from the list of bandwidth parts for the first bandwidth part group and a second set of bandwidth parts from the list of bandwidth parts for the second bandwidth part group. In some examples, the BWP group selection component 735 may transmit an indication of the selection for the first bandwidth part group and the second bandwidth part group to the base station.

Figure 8:
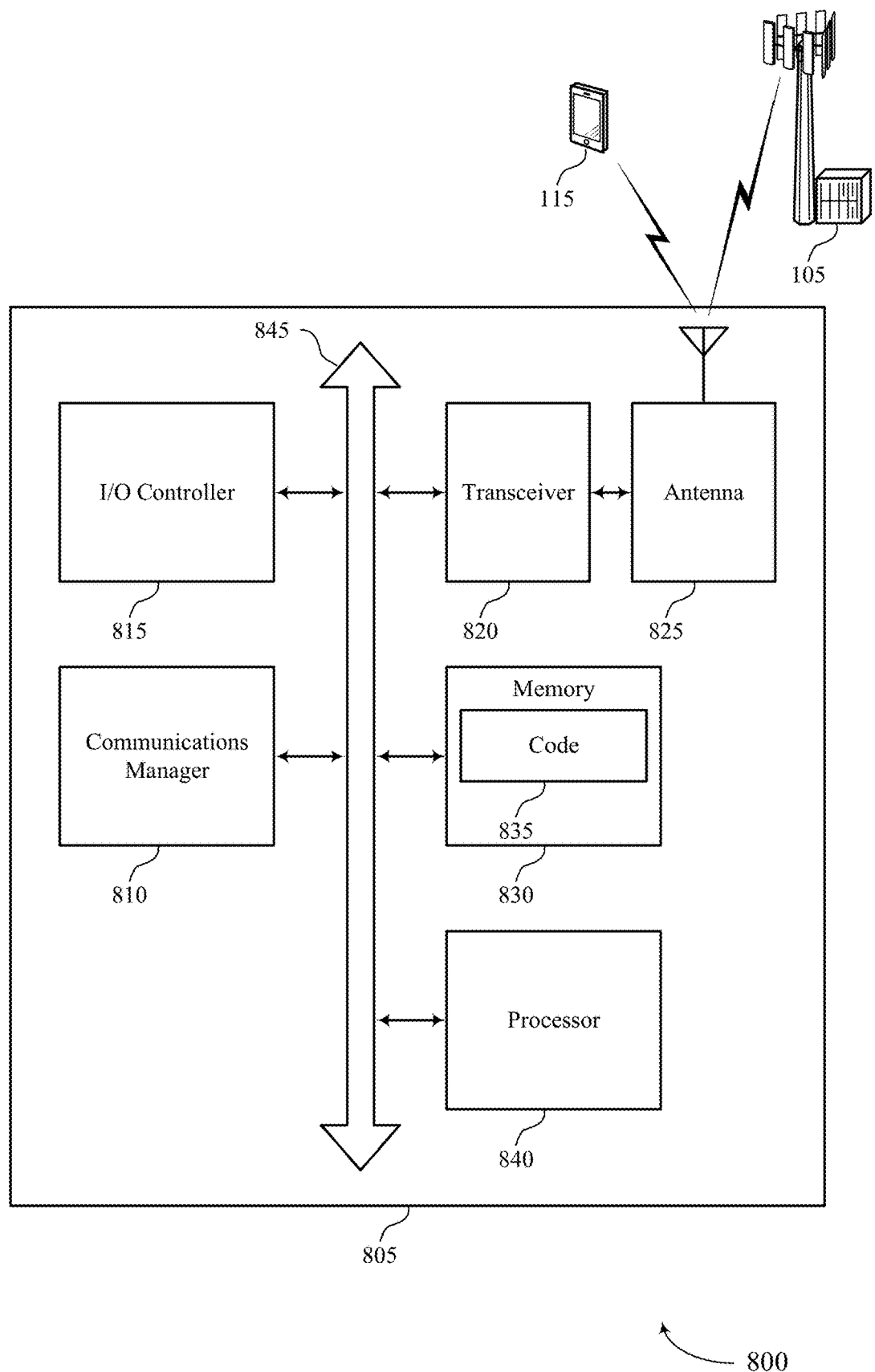
FIG. 8 shows a diagram of a system including a device that supports grouping BWPs for efficient BWP switching in accordance with aspects of the present disclosure.

FIG. 8 shows a diagram of a system 800 including a device 805 that supports grouping bandwidth parts for efficient bandwidth part switching in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a configuration for a set of bandwidth part groups including an intra-group switching delay and an inter-group switching delay, where the intra-group switching delay is smaller than the inter-group switching delay, communicate with a base station on a first bandwidth part of a first bandwidth part group of the set of bandwidth part groups, communicate with the base station on the second bandwidth part or the third bandwidth part based on switching, and switch to a second bandwidth part of the first bandwidth part group based on the intra-group switching delay or switching to a third bandwidth part of a second bandwidth part group of the set of bandwidth part groups based on the inter-group switching delay.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting grouping bandwidth parts for efficient bandwidth part switching).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
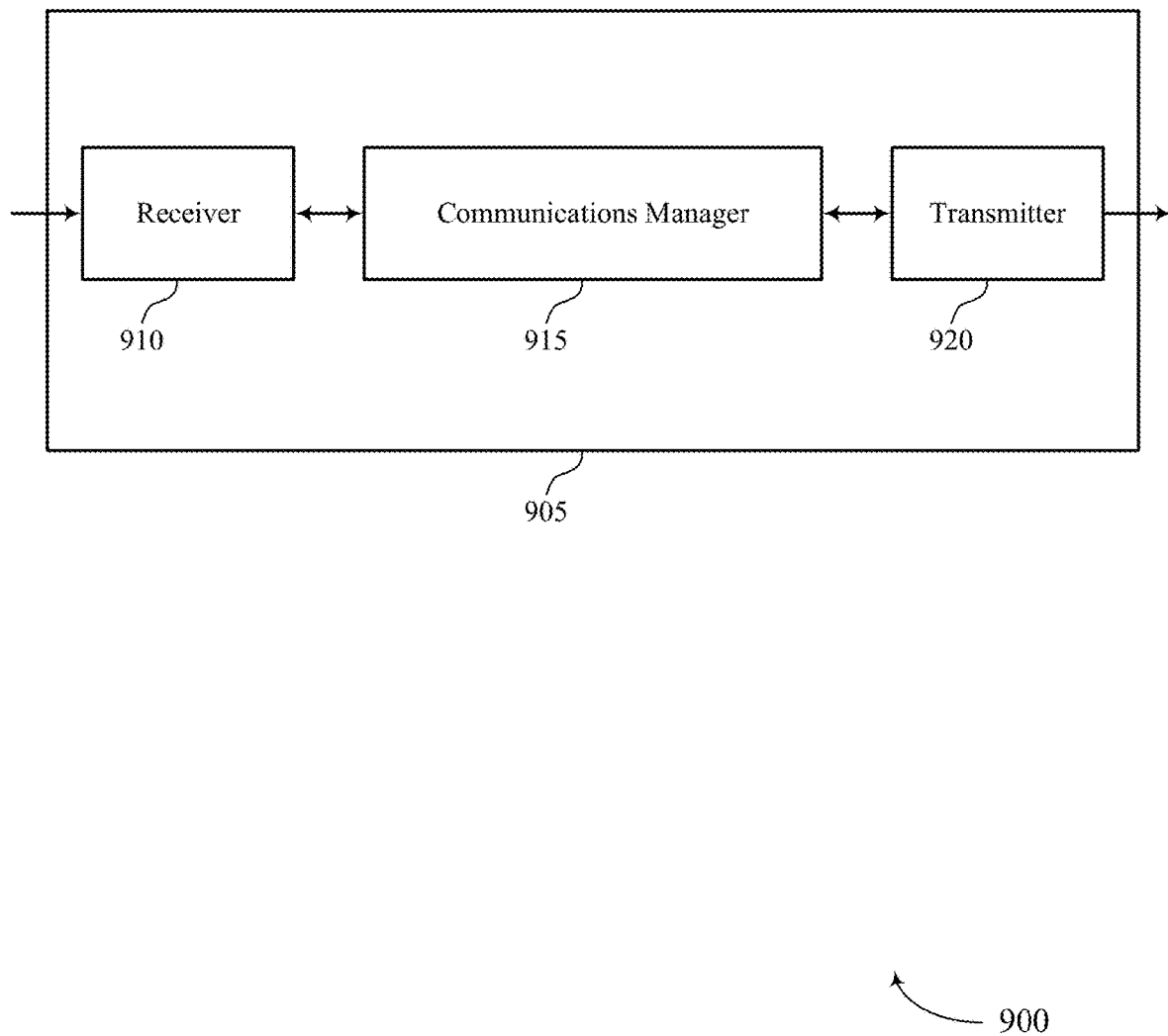
FIGS. 9 and 10 show block diagrams of devices that support grouping BWPs for efficient BWP switching in accordance with aspects of the present disclosure.

FIG. 9 shows a block diagram 900 of a device 905 that supports grouping bandwidth parts for efficient bandwidth part switching in accordance with aspects of the present disclosure. The device 905 may be an example of aspects of a base station 105 as described herein. The device 905 may include a receiver 910, a communications manager 915, and a transmitter 920. The device 905 may also include at least one processor. Each of these components may be in communication with one another (e.g., via one or more buses).

The receiver 910 may receive information such as packets, user data, or control information associated with various information channels (e.g., control channels, data channels, and information related to grouping bandwidth parts for efficient bandwidth part switching, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a configuration for a set of bandwidth part groups including an intra-group switching delay and an inter-group switching delay, where the intra-group switching delay is smaller than the inter-group switching delay, communicate with a UE on a first bandwidth part of a first bandwidth part group of the set of bandwidth part groups, communicate with the UE on the second bandwidth part or the third bandwidth part based on switching, and switch to a second bandwidth part of the first bandwidth part group based on the intra-group switching delay or switching to a third bandwidth part of a second bandwidth part group of the set of bandwidth part groups based on the inter-group switching delay. The communications manager 915 may be an example of aspects of the communications manager 1210 described herein.

The communications manager 915, or its sub-components, may be implemented in hardware, code (e.g., software or firmware) executed by at least one processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
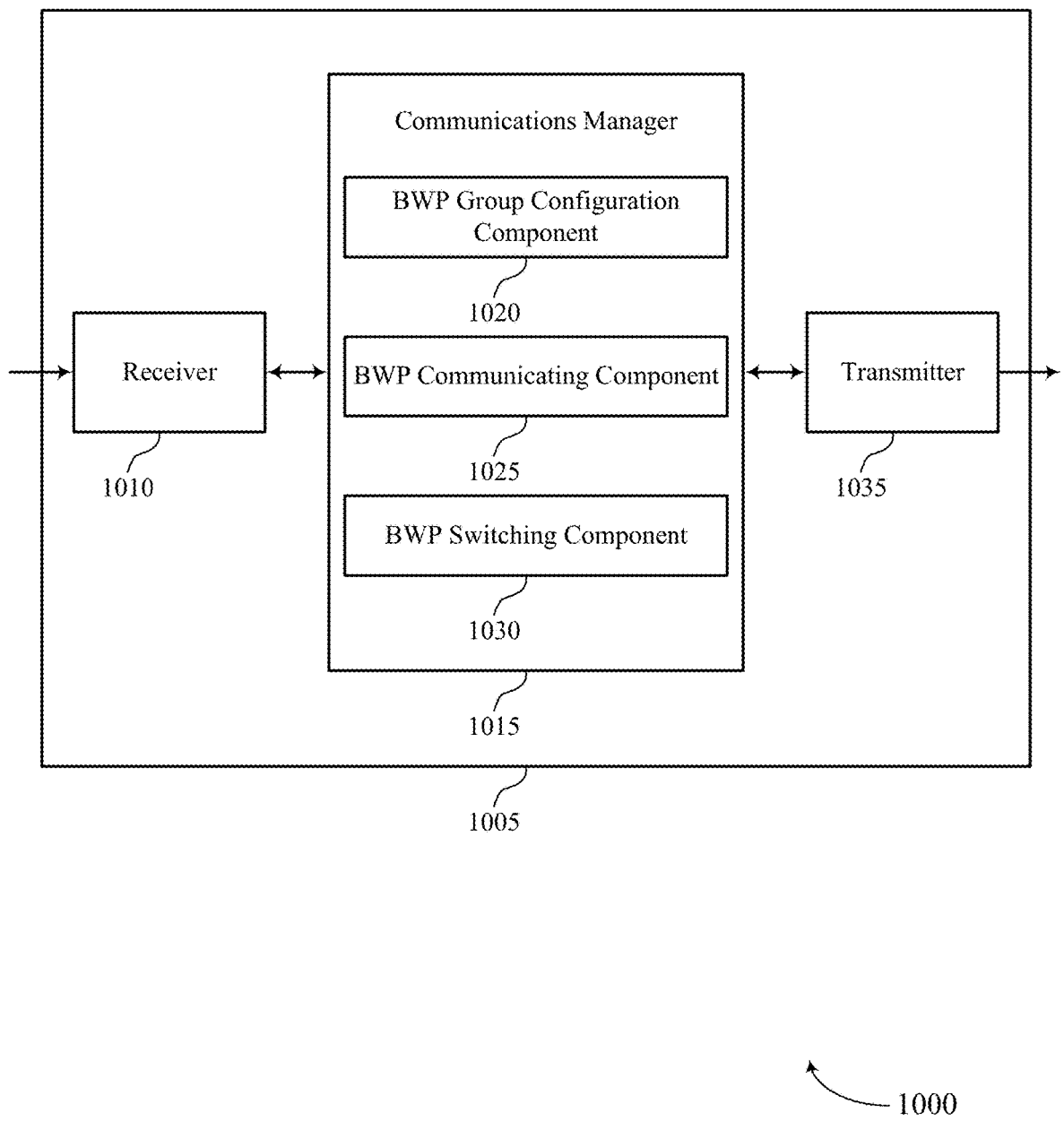

FIG. 10 shows a block diagram 1000 of a device 1005 that supports grouping bandwidth parts for efficient bandwidth part switching in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include at least one processor. Each of these components may be in communication with one another (e.g., via one or more buses).

The receiver 1010 may receive information such as packets, user data, or control information associated with various information channels (e.g., control channels, data channels, and information related to grouping bandwidth parts for efficient bandwidth part switching, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a BWP group configuration component 1020, a BWP communicating component 1025, and a BWP switching component 1030. The communications manager 1015 may be an example of aspects of the communications manager 1210 described herein.

The BWP group configuration component 1020 may identify a configuration for a set of bandwidth part groups including an intra-group switching delay and an inter-group switching delay, where the intra-group switching delay is smaller than the inter-group switching delay.

The BWP communicating component 1025 may communicate with a UE on a first bandwidth part of a first bandwidth part group of the set of bandwidth part groups and communicate with the UE on the second bandwidth part or the third bandwidth part based on switching.

The BWP switching component 1030 may switch to a second bandwidth part of the first bandwidth part group based on the intra-group switching delay or switching to a third bandwidth part of a second bandwidth part group of the set of bandwidth part groups based on the inter-group switching delay.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
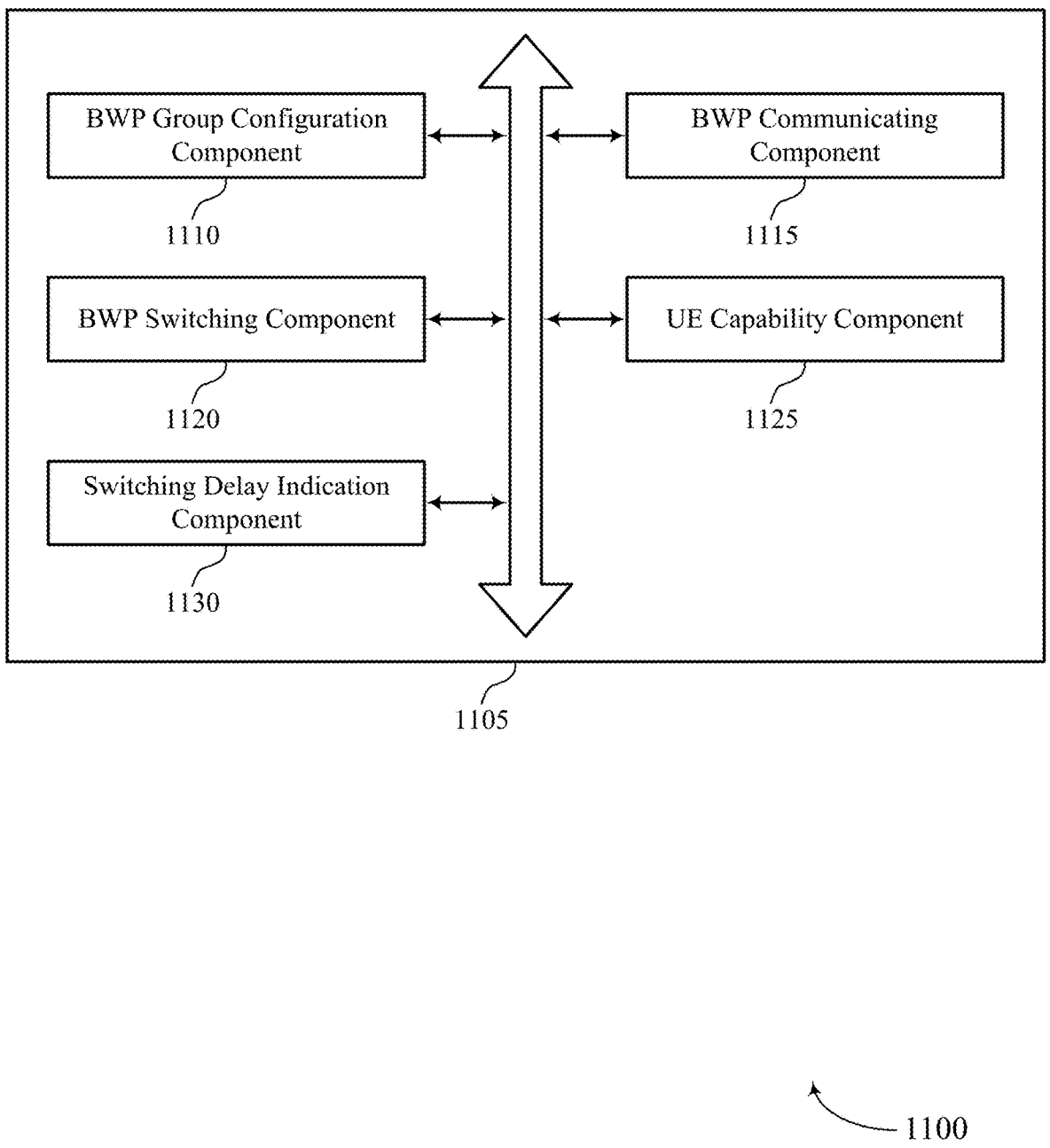
FIG. 11 shows a block diagram of a communications manager that supports grouping BWPs for efficient BWP switching in accordance with aspects of the present disclosure.

FIG. 11 shows a block diagram 1100 of a communications manager 1105 that supports grouping bandwidth parts for efficient bandwidth part switching in accordance with aspects of the present disclosure. The communications manager 1105 may be an example of aspects of a communications manager 915, a communications manager 1015, or a communications manager 1210 described herein. The communications manager 1105 may include a BWP group configuration component 1110, a BWP communicating component 1115, a BWP switching component 1120, an UE capability component 1125, and a switching delay indication component 1130. Each of these modules may communicate, directly or indirectly, with one another (e.g., via one or more buses).

The BWP group configuration component 1110 may identify a configuration for a set of bandwidth part groups including an intra-group switching delay and an inter-group switching delay, where the intra-group switching delay is smaller than the inter-group switching delay. In some examples, the bandwidth parts of the first bandwidth part group may be contiguous in frequency.

In some examples, the bandwidth parts of the first bandwidth part group may be non-contiguous in frequency. In some examples, the BWP group configuration component 1110 may configure a first set of bandwidth parts for the first bandwidth part group and a second set of bandwidth parts for the second bandwidth part group. In some examples, the BWP group configuration component 1110 may transmit an indication of the configuration for the first bandwidth part group and the second bandwidth part group to the UE.

In some examples, the BWP group configuration component 1110 may transmit a list of bandwidth parts from the base station. In some examples, the BWP group configuration component 1110 may receive, from the UE, an indication of bandwidth parts selected from the list of bandwidth parts for the first bandwidth part group and the second bandwidth part group.

In some examples, the BWP group configuration component 1110 may identify a fourth bandwidth part at least partially overlapping the first hop region and the second hop region. In some examples, the BWP group configuration component 1110 may determine a bandwidth part group for the fourth bandwidth part based on a larger overlap with the first hop region or the second hop region. In some examples, the BWP group configuration component 1110 may transmit, to the UE, an indication of whether the fourth bandwidth part is included in the first bandwidth part or the second bandwidth part group.

In some examples, the BWP group configuration component 1110 may determine the fourth bandwidth part is not included in a bandwidth part group based on partially overlapping the first hop region and the second hop region, where switching to the fourth bandwidth part is based on the inter-group switching delay.

In some examples, the BWP group configuration component 1110 may transmit signaling to the UE configuring a set of bandwidth parts of the first bandwidth part group, where the set of bandwidth parts are included in the first bandwidth part group based on the signaling. In some cases, the intra-group switching delay is based on a subcarrier spacing of the first bandwidth part group, a radio frequency spectrum band including the first bandwidth part group, or both. In some cases, the first bandwidth part group includes bandwidth parts in a first hop region. In some cases, the second bandwidth part group includes bandwidth parts in a second hop region.

The BWP communicating component 1115 may communicate with a UE on a first bandwidth part of a first bandwidth part group of the set of bandwidth part groups. In some examples, the BWP communicating component 1115 may communicate with the UE on the second bandwidth part or the third bandwidth part based on switching.

The BWP switching component 1120 may switch to a second bandwidth part of the first bandwidth part group based on the intra-group switching delay or switching to a third bandwidth part of a second bandwidth part group of the set of bandwidth part groups based on the inter-group switching delay.

The UE capability component 1125 may receive a UE capability for bandwidth part switching from the UE. In some examples, the UE capability component 1125 may determine the first bandwidth part group and the second bandwidth part group based on the UE capability.

The switching delay indication component 1130 may transmit an indication of the intra-group switching delay to the UE. In some examples, the switching delay indication component 1130 may determine the first bandwidth part group and the second bandwidth part group based on the indication of the intra-group switching delay.

Figure 12:
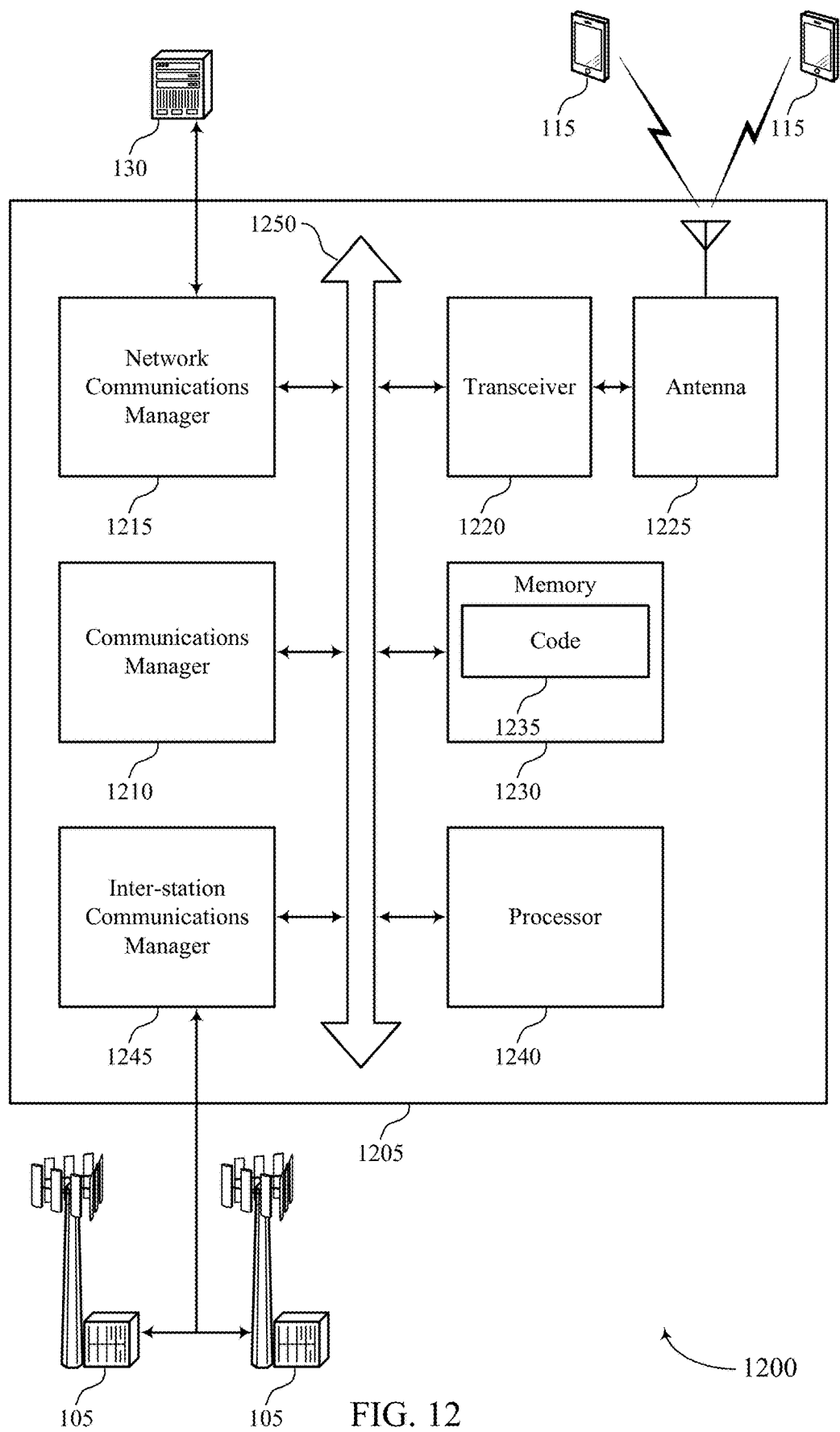
FIG. 12 shows a diagram of a system including a device that supports grouping BWPs for efficient BWP switching in accordance with aspects of the present disclosure.

FIG. 12 shows a diagram of a system 1200 including a device 1205 that supports grouping bandwidth parts for efficient bandwidth part switching in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a configuration for a set of bandwidth part groups including an intra-group switching delay and an inter-group switching delay, where the intra-group switching delay is smaller than the inter-group switching delay, communicate with a UE on a first bandwidth part of a first bandwidth part group of the set of bandwidth part groups, communicate with the UE on the second bandwidth part or the third bandwidth part based on switching, and switch to a second bandwidth part of the first bandwidth part group based on the intra-group switching delay or switching to a third bandwidth part of a second bandwidth part group of the set of bandwidth part groups based on the inter-group switching delay.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting grouping bandwidth parts for efficient bandwidth part switching).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
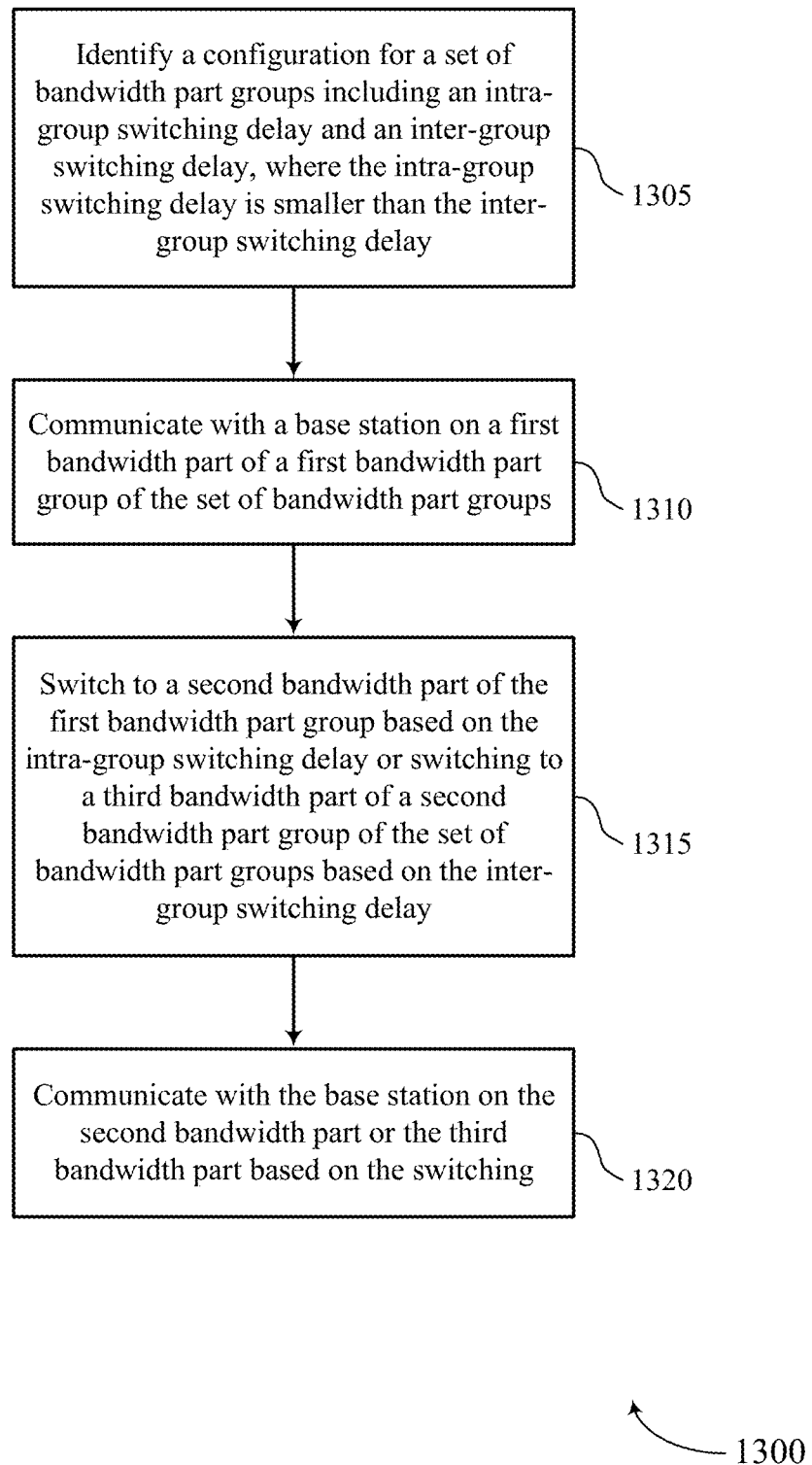
FIGS. 13 through 18 show flowcharts illustrating methods that support grouping BWPs for efficient BWP switching in accordance with aspects of the present disclosure.

FIG. 13 shows a flowchart illustrating a method 1300 that supports grouping bandwidth parts for efficient bandwidth part switching in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a configuration for a set of bandwidth part groups including an intra-group switching delay and an inter-group switching delay, where the intra-group switching delay is smaller than the inter-group switching delay. The operations of 1305 may be performed according to the methods described herein. In some examples, aspects of the operations of 1305 may be performed by a BWP group configuration component as described with reference to FIGS. 5 through 8.

At 1310, the UE may communicate with a base station on a first bandwidth part of a first bandwidth part group of the set of bandwidth part groups. The operations of 1310 may be performed according to the methods described herein. In some examples, aspects of the operations of 1310 may be performed by a BWP communicating component as described with reference to FIGS. 5 through 8.

At 1315, the UE may switch to a second bandwidth part of the first bandwidth part group based on the intra-group switching delay or switching to a third bandwidth part of a second bandwidth part group of the set of bandwidth part groups based on the inter-group switching delay. The operations of 1315 may be performed according to the methods described herein. In some examples, aspects of the operations of 1315 may be performed by a BWP switching component as described with reference to FIGS. 5 through 8.

At 1320, the UE may communicate with the base station on the second bandwidth part or the third bandwidth part based on switching. The operations of 1320 may be performed according to the methods described herein. In some examples, aspects of the operations of 1320 may be performed by a BWP communicating component as described with reference to FIGS. 5 through 8.

Figure 14:
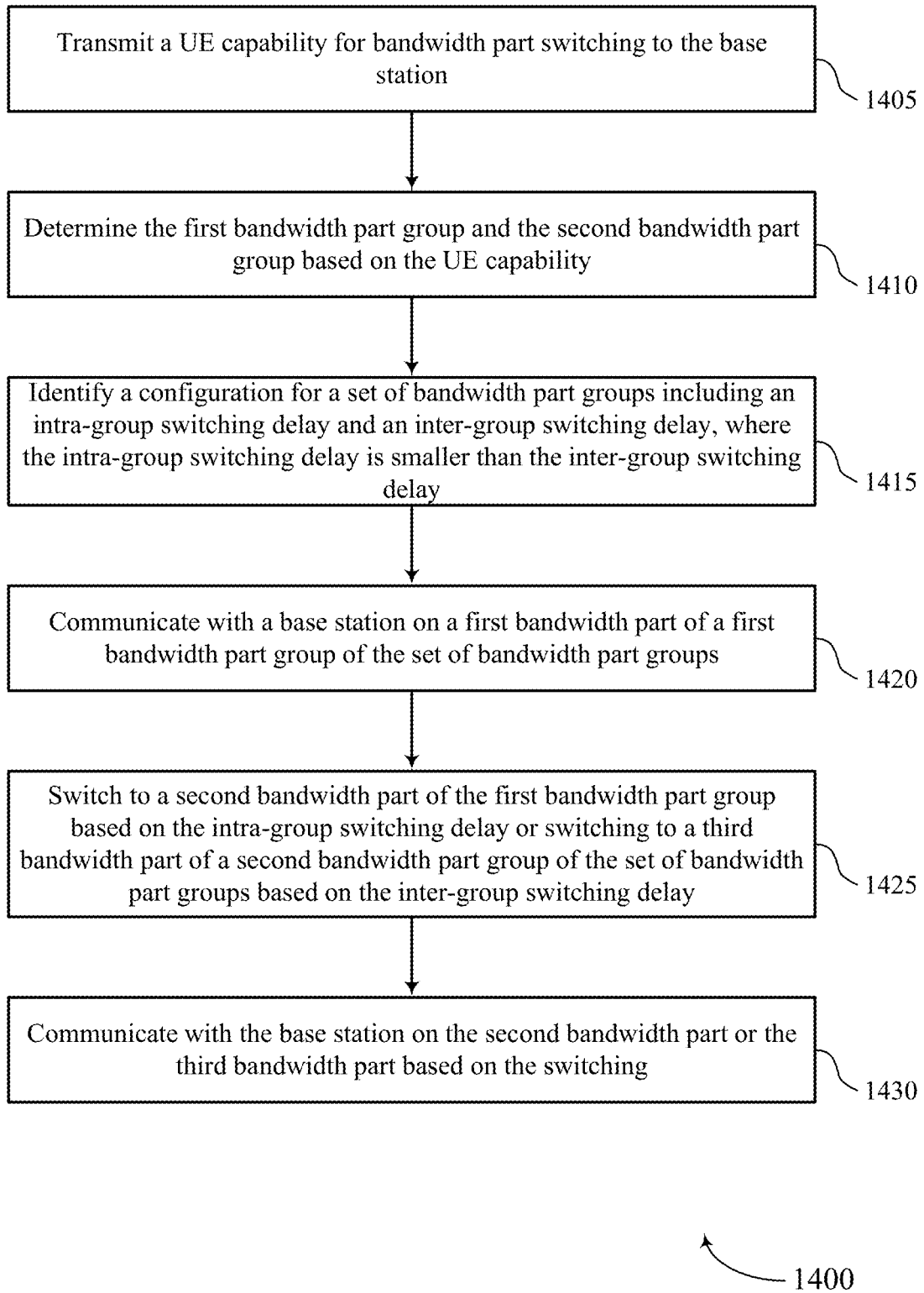

FIG. 14 shows a flowchart illustrating a method 1400 that supports grouping bandwidth parts for efficient bandwidth part switching in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit a UE capability for bandwidth part switching to the base station. The operations of 1405 may be performed according to the methods described herein. In some examples, aspects of the operations of 1405 may be performed by an UE capability component as described with reference to FIGS. 5 through 8.

At 1410, the UE may determine the first bandwidth part group and the second bandwidth part group based on the UE capability. The operations of 1410 may be performed according to the methods described herein. In some examples, aspects of the operations of 1410 may be performed by an UE capability component as described with reference to FIGS. 5 through 8.

At 1415, the UE may identify a configuration for a set of bandwidth part groups including an intra-group switching delay and an inter-group switching delay, where the intra-group switching delay is smaller than the inter-group switching delay. The operations of 1415 may be performed according to the methods described herein. In some examples, aspects of the operations of 1415 may be performed by a BWP group configuration component as described with reference to FIGS. 5 through 8.

At 1420, the UE may communicate with a base station on a first bandwidth part of a first bandwidth part group of the set of bandwidth part groups. The operations of 1420 may be performed according to the methods described herein. In some examples, aspects of the operations of 1420 may be performed by a BWP communicating component as described with reference to FIGS. 5 through 8.

At 1425, the UE may switch to a second bandwidth part of the first bandwidth part group based on the intra-group switching delay or switching to a third bandwidth part of a second bandwidth part group of the set of bandwidth part groups based on the inter-group switching delay. The operations of 1425 may be performed according to the methods described herein. In some examples, aspects of the operations of 1425 may be performed by a BWP switching component as described with reference to FIGS. 5 through 8.

At 1430, the UE may communicate with the base station on the second bandwidth part or the third bandwidth part based on switching. The operations of 1430 may be performed according to the methods described herein. In some examples, aspects of the operations of 1430 may be performed by a BWP communicating component as described with reference to FIGS. 5 through 8.

Figure 15:
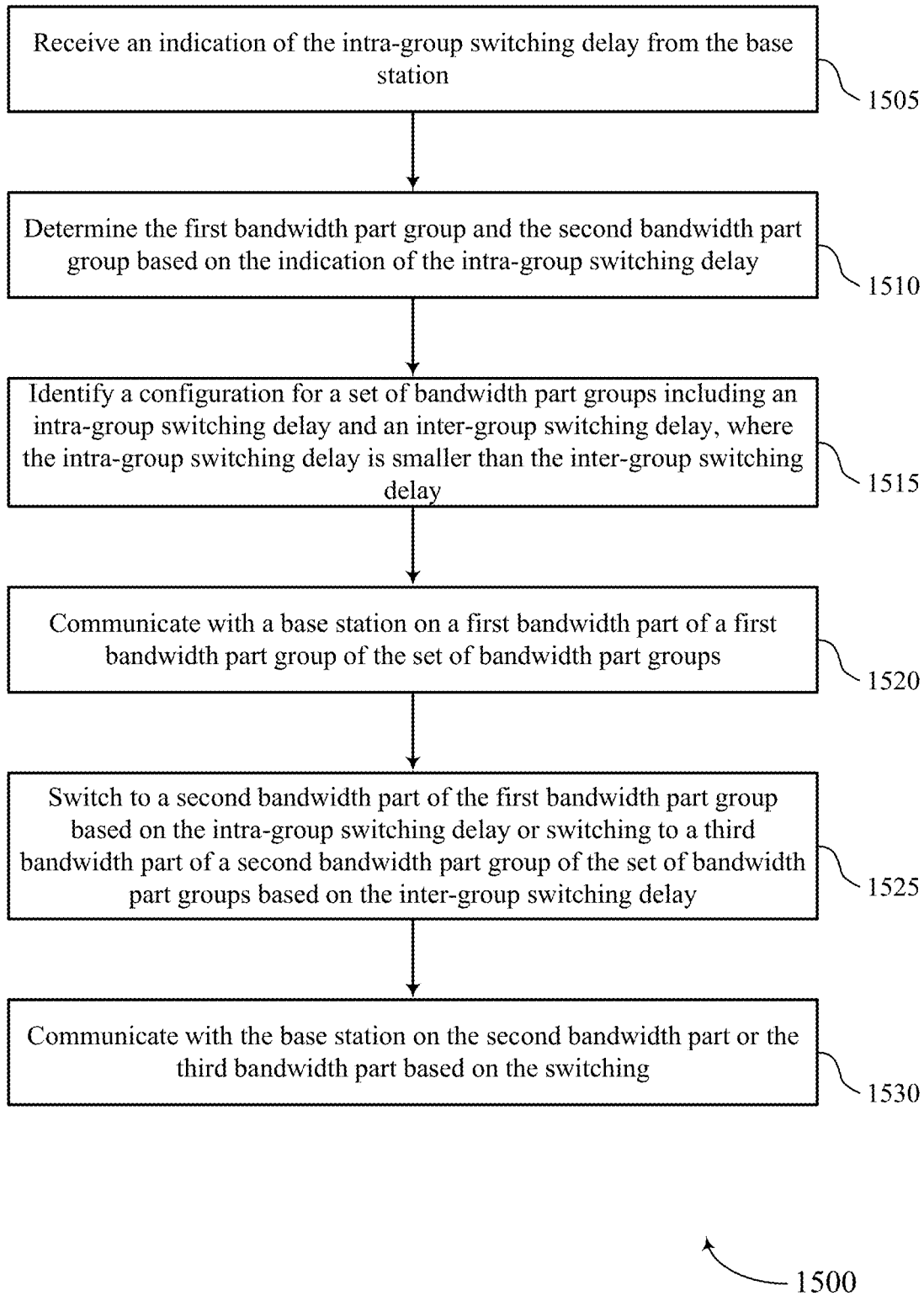

FIG. 15 shows a flowchart illustrating a method 1500 that supports grouping bandwidth parts for efficient bandwidth part switching in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive an indication of the intra-group switching delay from the base station. The operations of 1505 may be performed according to the methods described herein. In some examples, aspects of the operations of 1505 may be performed by a switching delay indication component as described with reference to FIGS. 5 through 8.

At 1510, the UE may determine the first bandwidth part group and the second bandwidth part group based on the indication of the intra-group switching delay. The operations of 1510 may be performed according to the methods described herein. In some examples, aspects of the operations of 1510 may be performed by a switching delay indication component as described with reference to FIGS. 5 through 8.

At 1515, the UE may identify a configuration for a set of bandwidth part groups including an intra-group switching delay and an inter-group switching delay, where the intra-group switching delay is smaller than the inter-group switching delay. The operations of 1515 may be performed according to the methods described herein. In some examples, aspects of the operations of 1515 may be performed by a BWP group configuration component as described with reference to FIGS. 5 through 8.

At 1520, the UE may communicate with a base station on a first bandwidth part of a first bandwidth part group of the set of bandwidth part groups. The operations of 1520 may be performed according to the methods described herein. In some examples, aspects of the operations of 1520 may be performed by a BWP communicating component as described with reference to FIGS. 5 through 8.

At 1525, the UE may switch to a second bandwidth part of the first bandwidth part group based on the intra-group switching delay or switching to a third bandwidth part of a second bandwidth part group of the set of bandwidth part groups based on the inter-group switching delay. The operations of 1525 may be performed according to the methods described herein. In some examples, aspects of the operations of 1525 may be performed by a BWP switching component as described with reference to FIGS. 5 through 8.

At 1530, the UE may communicate with the base station on the second bandwidth part or the third bandwidth part based on switching. The operations of 1530 may be performed according to the methods described herein. In some examples, aspects of the operations of 1530 may be performed by a BWP communicating component as described with reference to FIGS. 5 through 8.

Figure 16:
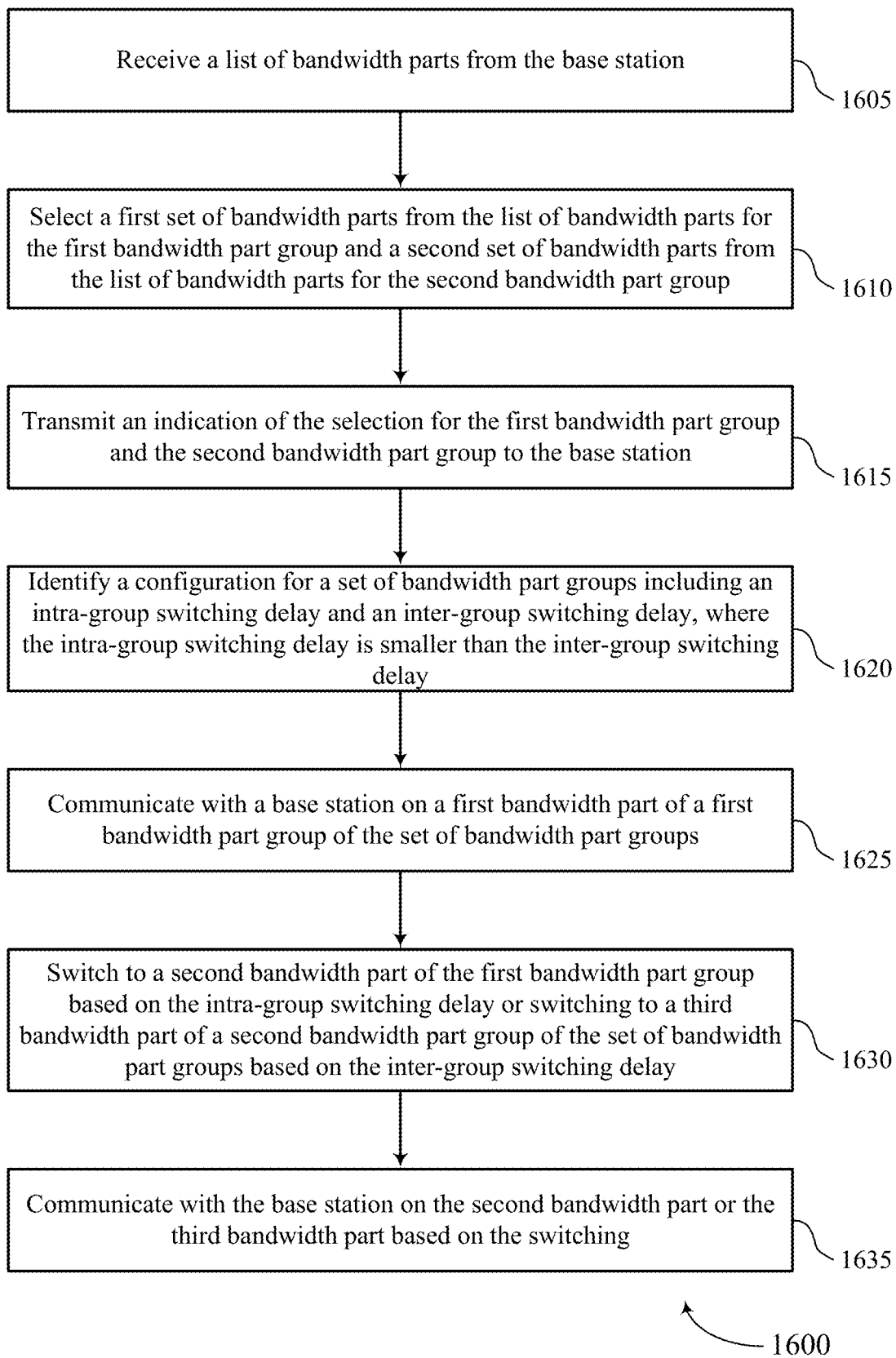

FIG. 16 shows a flowchart illustrating a method 1600 that supports grouping bandwidth parts for efficient bandwidth part switching in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive a list of bandwidth parts from the base station. The operations of 1605 may be performed according to the methods described herein. In some examples, aspects of the operations of 1605 may be performed by a BWP group selection component as described with reference to FIGS. 5 through 8.

At 1610, the UE may select a first set of bandwidth parts from the list of bandwidth parts for the first bandwidth part group and a second set of bandwidth parts from the list of bandwidth parts for the second bandwidth part group. The operations of 1610 may be performed according to the methods described herein. In some examples, aspects of the operations of 1610 may be performed by a BWP group selection component as described with reference to FIGS. 5 through 8.

At 1615, the UE may transmit an indication of the selection for the first bandwidth part group and the second bandwidth part group to the base station. The operations of 1615 may be performed according to the methods described herein. In some examples, aspects of the operations of 1615 may be performed by a BWP group selection component as described with reference to FIGS. 5 through 8.

At 1620, the UE may identify a configuration for a set of bandwidth part groups including an intra-group switching delay and an inter-group switching delay, where the intra-group switching delay is smaller than the inter-group switching delay. The operations of 1620 may be performed according to the methods described herein. In some examples, aspects of the operations of 1620 may be performed by a BWP group configuration component as described with reference to FIGS. 5 through 8.

At 1625, the UE may communicate with a base station on a first bandwidth part of a first bandwidth part group of the set of bandwidth part groups. The operations of 1625 may be performed according to the methods described herein. In some examples, aspects of the operations of 1625 may be performed by a BWP communicating component as described with reference to FIGS. 5 through 8.

At 1630, the UE may switch to a second bandwidth part of the first bandwidth part group based on the intra-group switching delay or switching to a third bandwidth part of a second bandwidth part group of the set of bandwidth part groups based on the inter-group switching delay. The operations of 1630 may be performed according to the methods described herein. In some examples, aspects of the operations of 1630 may be performed by a BWP switching component as described with reference to FIGS. 5 through 8.

At 1635, the UE may communicate with the base station on the second bandwidth part or the third bandwidth part based on switching. The operations of 1635 may be performed according to the methods described herein. In some examples, aspects of the operations of 1635 may be performed by a BWP communicating component as described with reference to FIGS. 5 through 8.

Figure 17:
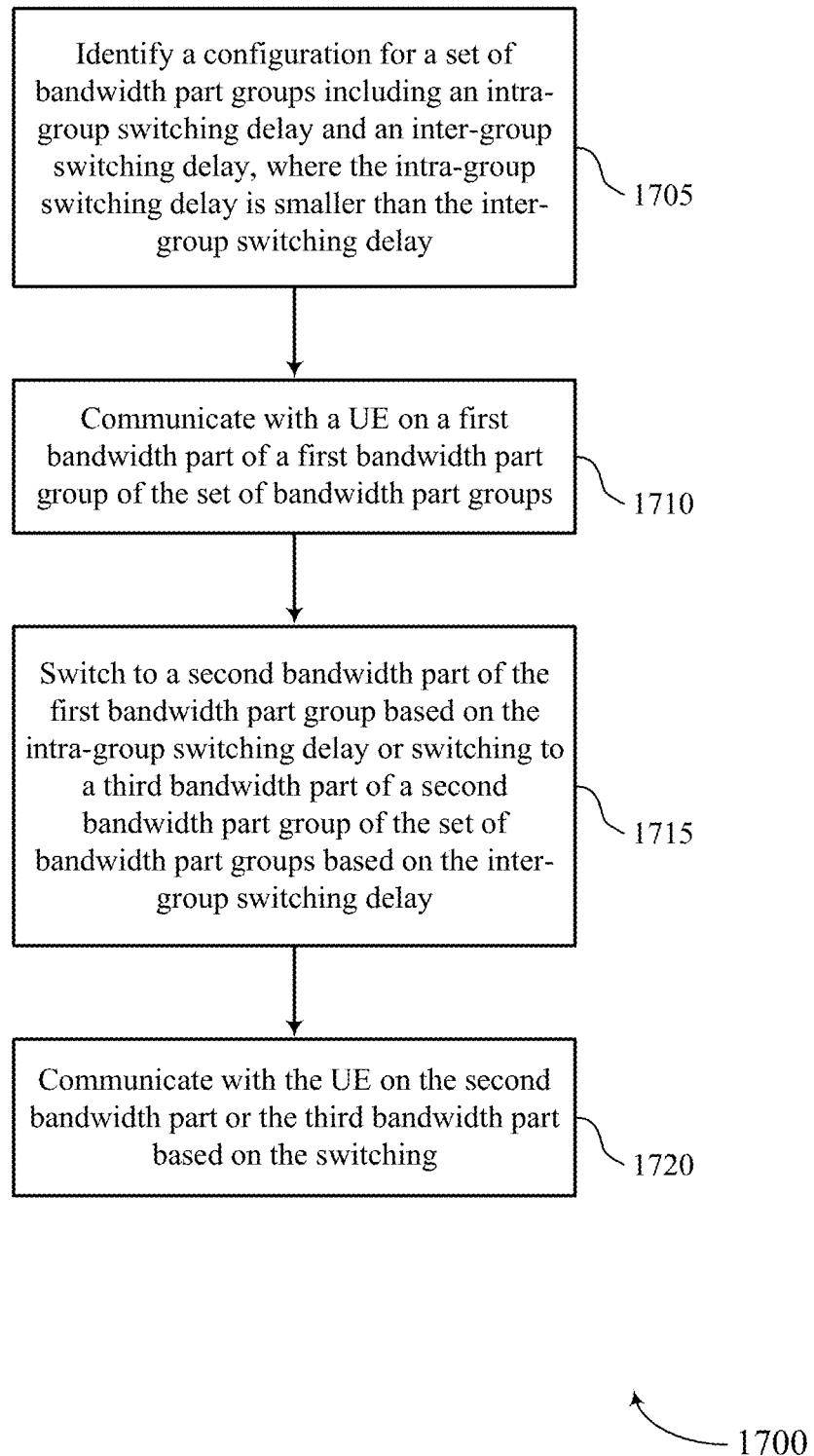

FIG. 17 shows a flowchart illustrating a method 1700 that supports grouping bandwidth parts for efficient bandwidth part switching in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify a configuration for a set of bandwidth part groups including an intra-group switching delay and an inter-group switching delay, where the intra-group switching delay is smaller than the inter-group switching delay. The operations of 1705 may be performed according to the methods described herein. In some examples, aspects of the operations of 1705 may be performed by a BWP group configuration component as described with reference to FIGS. 9 through 12.

At 1710, the base station may communicate with a UE on a first bandwidth part of a first bandwidth part group of the set of bandwidth part groups. The operations of 1710 may be performed according to the methods described herein. In some examples, aspects of the operations of 1710 may be performed by a BWP communicating component as described with reference to FIGS. 9 through 12.

At 1715, the base station may switch to a second bandwidth part of the first bandwidth part group based on the intra-group switching delay or switching to a third bandwidth part of a second bandwidth part group of the set of bandwidth part groups based on the inter-group switching delay. The operations of 1715 may be performed according to the methods described herein. In some examples, aspects of the operations of 1715 may be performed by a BWP switching component as described with reference to FIGS. 9 through 12.

At 1720, the base station may communicate with the UE on the second bandwidth part or the third bandwidth part based on switching. The operations of 1720 may be performed according to the methods described herein. In some examples, aspects of the operations of 1720 may be performed by a BWP communicating component as described with reference to FIGS. 9 through 12.

Figure 18:
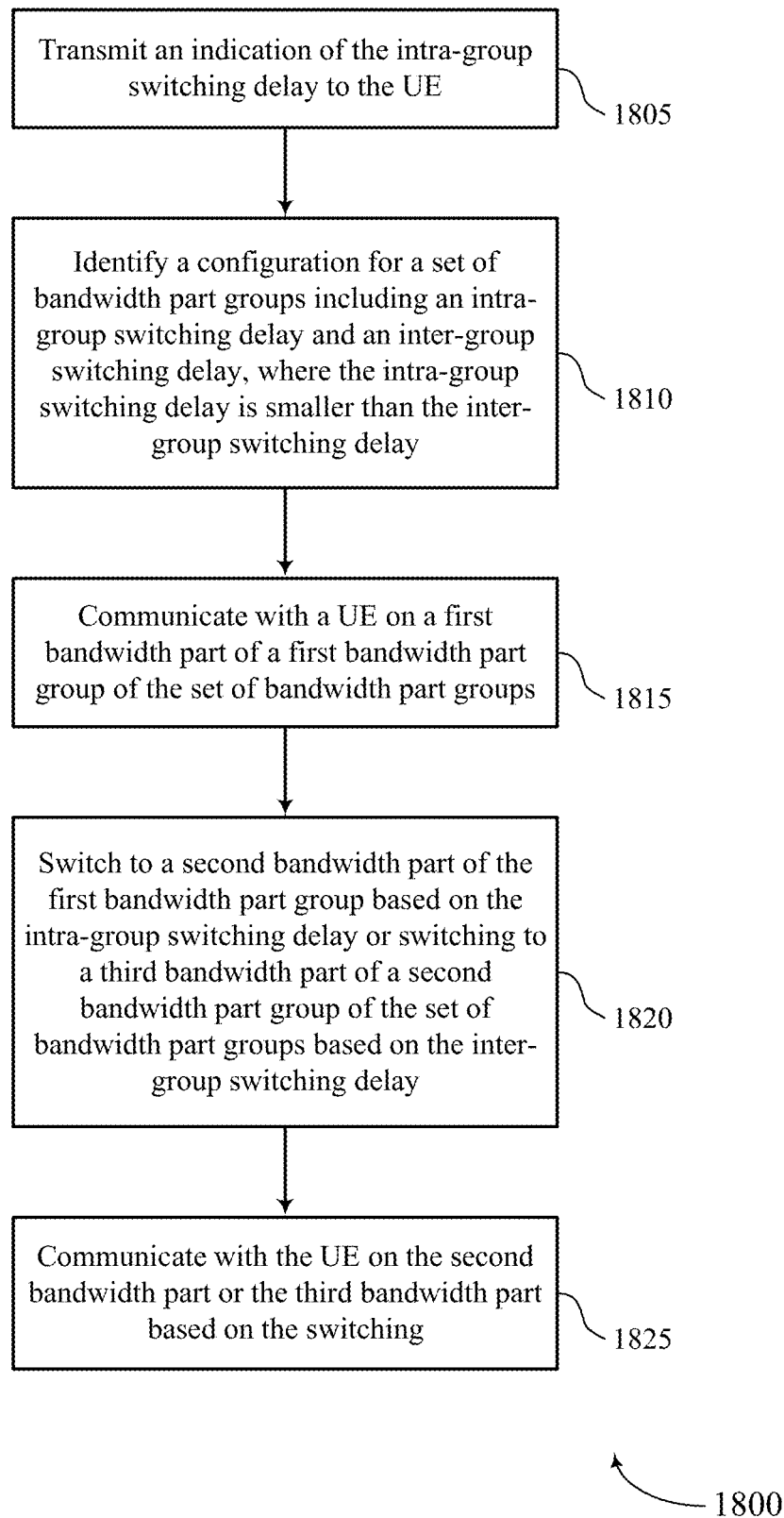

FIG. 18 shows a flowchart illustrating a method 1800 that supports grouping bandwidth parts for efficient bandwidth part switching in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may transmit an indication of the intra-group switching delay to the UE. The operations of 1805 may be performed according to the methods described herein. In some examples, aspects of the operations of 1805 may be performed by a switching delay indication component as described with reference to FIGS. 9 through 12.

At 1810, the base station may identify a configuration for a set of bandwidth part groups including an intra-group switching delay and an inter-group switching delay, where the intra-group switching delay is smaller than the inter-group switching delay. The operations of 1810 may be performed according to the methods described herein. In some examples, aspects of the operations of 1810 may be performed by a BWP group configuration component as described with reference to FIGS. 9 through 12.

At 1815, the base station may communicate with a UE on a first bandwidth part of a first bandwidth part group of the set of bandwidth part groups. The operations of 1815 may be performed according to the methods described herein. In some examples, aspects of the operations of 1815 may be performed by a BWP communicating component as described with reference to FIGS. 9 through 12.

At 1820, the base station may switch to a second bandwidth part of the first bandwidth part group based on the intra-group switching delay or switching to a third bandwidth part of a second bandwidth part group of the set of bandwidth part groups based on the inter-group switching delay. The operations of 1820 may be performed according to the methods described herein. In some examples, aspects of the operations of 1820 may be performed by a BWP switching component as described with reference to FIGS. 9 through 12.

At 1825, the base station may communicate with the UE on the second bandwidth part or the third bandwidth part based on switching. The operations of 1825 may be performed according to the methods described herein. In some examples, aspects of the operations of 1825 may be performed by a BWP communicating component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Figure 19:
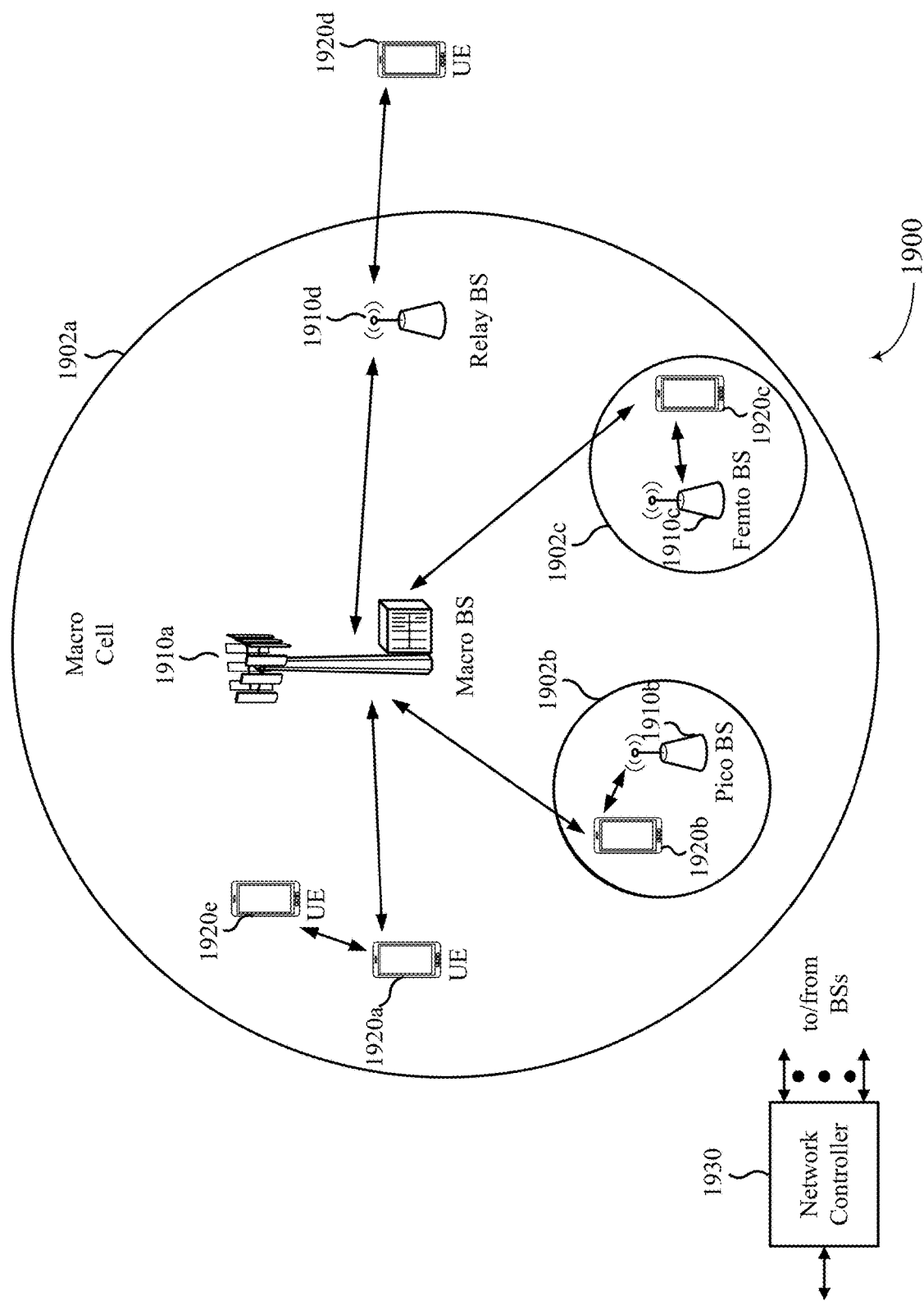
FIG. 19 illustrates an example of a network that supports grouping BWPs for efficient BWP switching in accordance with aspects of the present disclosure.

FIG. 19 illustrates an example of a network 1900 that supports grouping bandwidth parts for efficient bandwidth part switching in accordance with aspects of the present disclosure. The network 1900 may be a 5G or NR network or some other wireless network, such as an LTE network. In some cases, the wireless network 1900 may be an example of a wireless communication system 100 as described with reference to FIG. 1.

Wireless network 1900 may include a number of BSs 1910 (shown as BS 1910a, BS 1910b, BS 1910c, and BS 1910d) and other network entities. A BS is an entity that communicates with one or more UEs and may also be referred to as a base station, an NR BS, a Node B, a gNB, a 5G node B (NB), an access point, a transmit receive point (TRP), and/or the like. Each BS may provide communications coverage for a particular geographic area. In some cases, a BS 1910 may be an example of a base station 105 as described with reference to FIG. 1. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 19, a BS 1910a may be a macro BS for a macro cell 1902a, a BS 1910b may be a pico BS for a pico cell 1902b, and a BS 1910c may be a femto BS for a femto cell 1902c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 1900 through various types of backhaul interfaces such as a direct physical connection, a virtual network, and/or the like using any suitable transport network.

Wireless network 1900 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 19, a relay station 1910d may communicate with macro BS 1910a and a UE 1920d in order to facilitate communications between BS 1910a and UE 1920d. A relay station may also be referred to as a relay BS, a relay base station, a relay, and/or the like.

Wireless network 1900 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 1900. For example, macro BSs may have a high transmit power level (e.g., 5 to 40 Watts) whereas pico BSs, femto BSs, and relay BSs may have lower transmit power levels (e.g., 0.1 to 2 Watts).

A network controller 1930 may couple to a set of BSs and may provide coordination and control for these BSs. Network controller 1930 may communicate with the BSs via a backhaul. The BSs may also communicate with one another, e.g., directly or indirectly via a wireless or wireline backhaul.

UEs 1920 (e.g., 1920a, 1920b, 1920c) may be dispersed throughout wireless network 1900, and each UE may be stationary or mobile. A UE may also be referred to as an access terminal, a terminal, a mobile station, a subscriber unit, a station, and/or the like. In some cases, a UE 1920 may be an example of a UE 115 as described with reference to FIG. 1. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 1920 may be included inside a housing that houses components of UE 1920, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 1920 (e.g., shown as UE 1920a and UE 1920e) may communicate directly using one or more sidelink channels (e.g., without using a base station 1910 as an intermediary to communicate with one another). For example, the UEs 1920 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 1920 may perform scheduling operations, resource selection operations, and/or other operations described elsewhere herein as being performed by the base station 1910.

Figure 20:
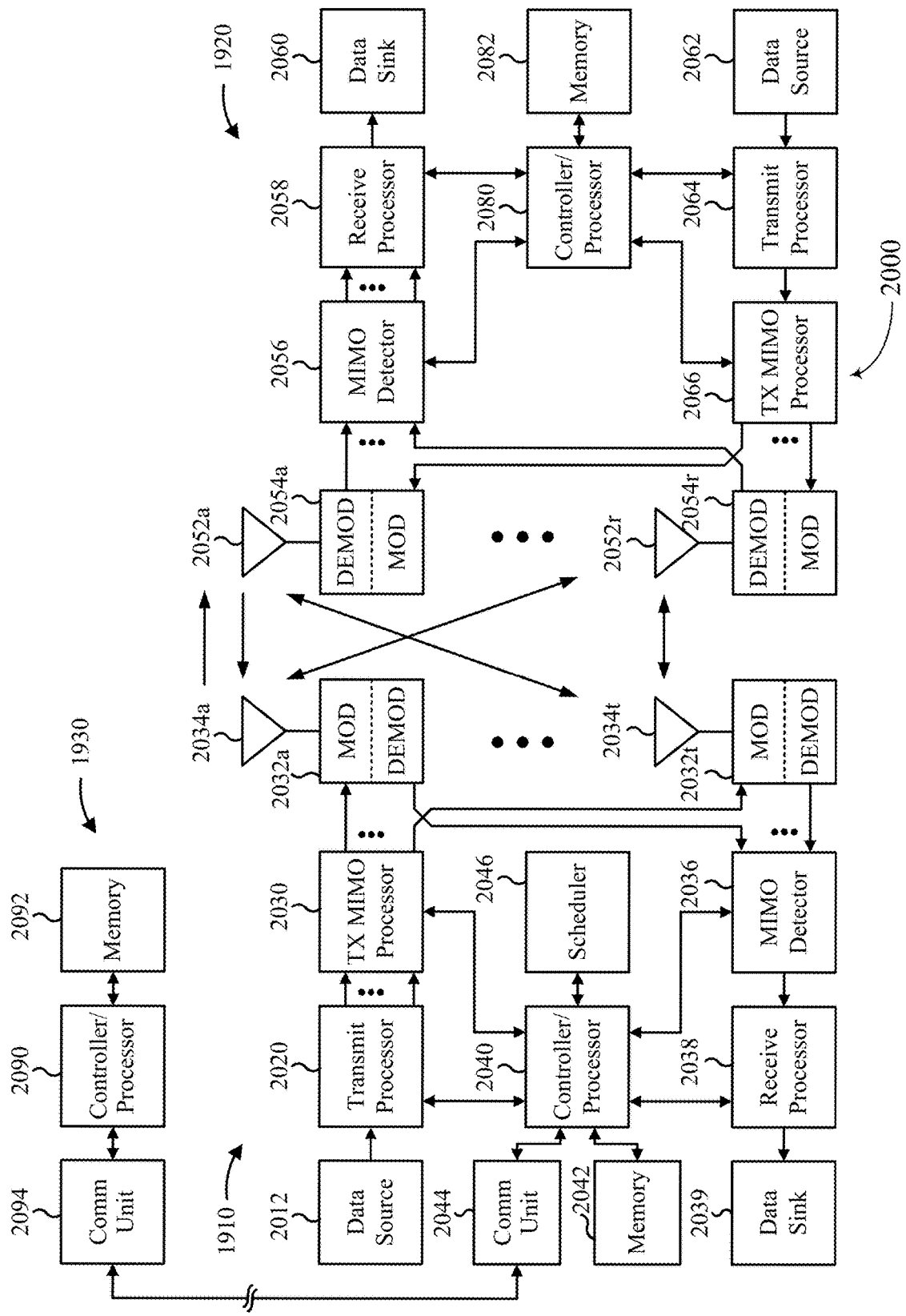
FIG. 20 illustrates an example of a block diagram of a design that supports grouping BWPs for efficient BWP switching in accordance with aspects of the present disclosure.

FIG. 20 illustrates an example of a block diagram of a design 2000 that supports grouping bandwidth parts for efficient bandwidth part switching in accordance with aspects of the present disclosure. The block diagram of the design 2000 may be one of the base stations and one of the UEs in FIG. 1. Base station 1910 may be equipped with T antennas 2034a through 2034t, and UE 1920 may be equipped with R antennas 2052a through 2052r, where in general T≥1 and R≥1.

At base station 1910, a transmit processor 2020 may receive data from a data source 2012 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 2020 may also process system information (e.g., for semi-static resource partitioning information (SRPI) and/or the like) and control information (e.g., CQI requests, grants, upper layer signaling, and/or the like) and provide overhead symbols and control symbols. Transmit processor 2020 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 2030 may perform spatial processing (e.g., precoding) on the data symbols, the control symbols, the overhead symbols, and/or the reference symbols, if applicable, and may provide T output symbol streams to T modulators (MODs) 2032a through 2032t. Each modulator 2032 may process a respective output symbol stream (e.g., for OFDM and/or the like) to obtain an output sample stream. Each modulator 2032 may further process (e.g., convert to analog, amplify, filter, and upconvert) the output sample stream to obtain a downlink signal. T downlink signals from modulators 2032a through 2032t may be transmitted via T antennas 2034a through 2034t, respectively. According to various aspects described in more detail below, the synchronization signals can be generated with location encoding to convey additional information.

At UE 1920, antennas 2052a through 2052r may receive the downlink signals from base station 1910 and/or other base stations and may provide received signals to demodulators (DEMODs) 2054a through 2054r, respectively. Each demodulator 2054 may condition (e.g., filter, amplify, downconvert, and digitize) a received signal to obtain input samples. Each demodulator 2054 may further process the input samples (e.g., for OFDM and/or the like) to obtain received symbols. A MIMO detector 2056 may obtain received symbols from all R demodulators 2054a through 2054r, perform MIMO detection on the received symbols if applicable, and provide detected symbols. A receive processor 2058 may process (e.g., demodulate and decode) the detected symbols, provide decoded data for UE 1920 to a data sink 2060, and provide decoded control information and system information to a controller/processor 2080. A channel processor may determine reference signal received power (RSRP), received signal strength indicator (RSSI), reference signal received quality (RSRQ), channel quality indicator (CQI), and/or the like. In some aspects, one or more components of UE 1920 may be included in a housing.

On the uplink, at UE 1920, a transmit processor 2064 may receive and process data from a data source 2062 and control information (e.g., for reports comprising RSRP, RSSI, RSRQ, CQI, and/or the like) from controller/processor 2080. Transmit processor 2064 may also generate reference symbols for one or more reference signals. The symbols from transmit processor 2064 may be precoded by a TX MIMO processor 2066 if applicable, further processed by modulators 2054a through 2054r (e.g., for DFT-s-OFDM, CP-OFDM, and/or the like), and transmitted to base station 1910. At base station 1910, the uplink signals from UE 1920 and other UEs may be received by antennas 2034, processed by demodulators 2054, detected by a MIMO detector 2036 if applicable, and further processed by a receive processor 2038 to obtain decoded data and control information sent by UE 1920. Receive processor 2038 may provide the decoded data to a data sink 2039 and the decoded control information to controller/processor 2040. Base station 1910 may include communications unit 2044 and communicate to network controller 1930 via communications unit 2044. Network controller 1930 may include communications unit 2094, controller/processor 2090, and memory 2092.

Controller/processor 2040 of base station 1910, controller/processor 2080 of UE 1920, and/or any other component(s) of FIG. 20 may perform one or more techniques associated with machine learning for non-linearities, as described in more detail elsewhere, the disclosure of which is incorporated by reference herein in its entirety. For example, controller/processor 2040 of base station 1910, controller/processor 2080 of UE 1920, and/or any other component(s) of FIG. 20 may perform or direct operations of, for example, the process of FIG. 5 and/or other processes as described. Memories 2042 and 2082 may store data and program codes for base station 1910 and UE 1920, respectively. A scheduler 2046 may schedule UEs for data transmission on the downlink and/or uplink.

In some aspects, UE 1920 may include means for defining, means for switching, and means for communicating. Such means may include one or more components of the UE 1920 or base station 1910 described in connection with FIG. 20. As indicated above, FIG. 20 is provided merely as an example. Other examples may differ from what is described with regard to FIG. 20.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 21:
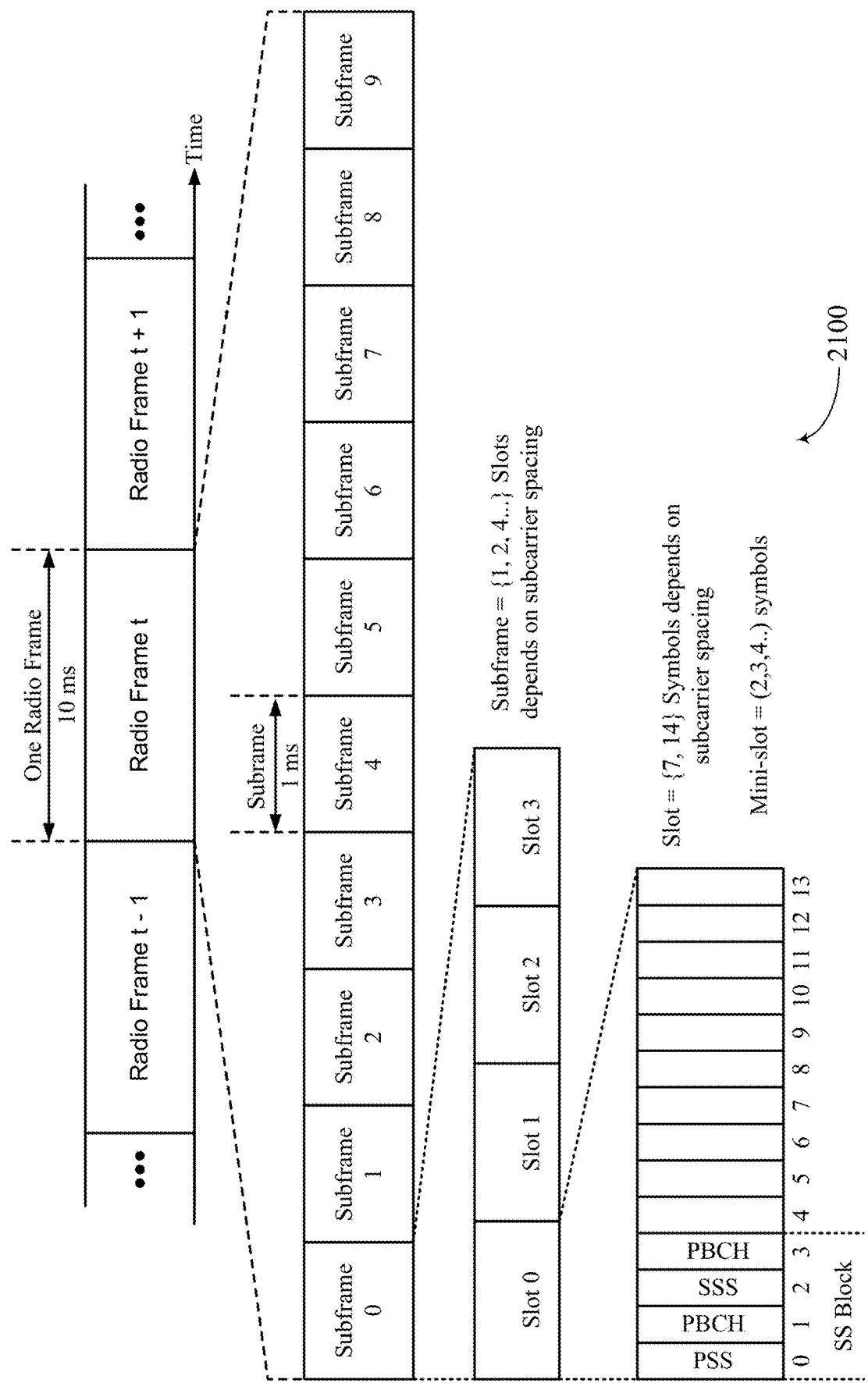
FIG. 21 illustrates a diagram showing an example of a frame format that supports grouping BWPs for efficient BWP switching in accordance with aspects of the present disclosure.

FIG. 21 illustrates a diagram showing an example of a frame format 2100 that supports grouping bandwidth parts for efficient bandwidth part switching in accordance with aspects of the present disclosure. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

As indicated above, FIGS. 19-21 are provided as examples. Other examples may differ from what is described with respect to FIGS. 19-21.

A term known as BWP may be defined to indicate a set of contiguous PRBs in the frequency domain. These contiguous PRBs are configured for a user. Resource allocation occurs within each BWP. In some cases, several BWPs may be configured to a user but only one BWP is activated at a given time.

Hopping between BWPs (or subbands (SBs)) may reduce base station interference effects that can affect certain BWPs (or SBs). For example, certain BWPs/SBs may experience higher interference than other BWPs/SBs. Unfortunately, hopping reduces utilization of network resources because of BWP/SB switching gaps. That is, BWP/SB switching gaps can be long (in the order of one to three ms) and this can cause delays to the overall scheduling, especially if switching occurs frequently.

In 5G NR, the UE sends a capability (BWPSwitchDelay) indicating how fast the UE can switch, based on the UE's processing speed. Some systems may include two types of capabilities for BWP switching, which may correspond to a slow switching and a fast switching. For example, in the current 3GPP standard, there may be two types of capabilities corresponding to fast and slow. In some cases, these capabilities may be defined in 3GPP TS 38.133 Table 8.6.2-1: BWP switch delay.

For downlink control information (DCI)-based BWP switching, the switching time/gap is mainly due to: UE DCI processing time (including receiving and processing the DCI), modem layer 1 (L1) processing time (loop re-initializations and settling, time tracking, sequence tracking, etc.), and RF retuning time.

Figure 22:
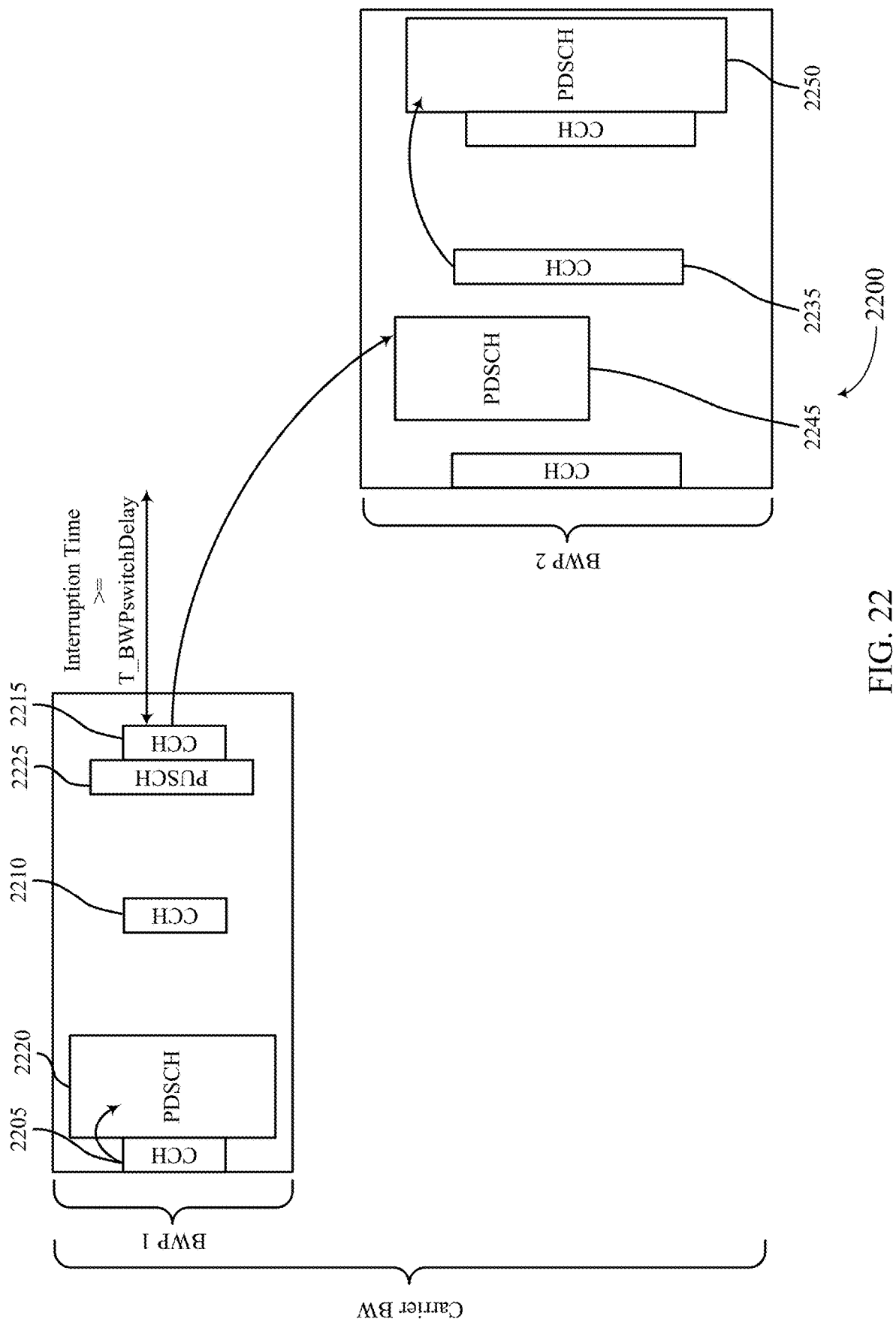
FIG. 22 illustrates an example operations that support grouping BWPs for efficient BWP switching in accordance with aspects of the present disclosure.

FIG. 22 illustrates an example of operations 2200 that support grouping bandwidth parts for efficient bandwidth part switching in accordance with aspects of the present disclosure. The operations 2200 may support BWP switching, in accordance with aspects of the present disclosure. In FIG. 22, two BWPs (e.g., BWP1 and BWP2) are configured. Each of BWP1 and BWP2 may have its own associated configurations, such as PDCCH, PDSCH, PUCCH, PUSCH, and RS configurations. For instance, BWP1 may have control channel (CCH) 2205 that allocates resources for PDSCH 2220, and CCH 2210 that allocates resources for PUSCH 2225. A BWP may be dynamically switched by scheduling downlink control information (DCI) (e.g., format 0_1/1_1). For example, as illustrated, CCH 2215 in BWP1 allocates resources for PDSCH 2245 in BWP2. BWP2 may also have its own associated configurations. For example, CCH 2235 allocates resources for PDSCH 2250. As illustrated and noted above, a gap exists between BWP1 and BWP2, resulting in an interruption time equal to or greater than the BWP switch delay (e.g., $T_{BWPswitchDelay}$). The gap allows for DCI processing time, modem L1 processing time, and reconfiguration of RF front-end circuitry for the new BWP.

In some cases, the BWP/SB switch times and configurations are preconfigured before the switch time. That is, the UE knows that at a certain time, a specific BWP is to be used. For example, in the case of BWP/SB hopping, the hopping pattern may already be configured. In these cases, the UE DCI processing time can be excluded from the switch time because the UE already knows when it will switch. Moreover, in BWP/SB hopping, a single BWP/SB configuration (e.g., SCS, PRACH occasion, etc.) is used for all the hops. Certain UE implementations may leverage this characteristic and considerably reduce the modem L1 processing times. Consequently, a UE may be able to switch BWPs faster than currently existing NR defined times when BWP/SB switches are pre-configured.

According to the present disclosure, a new BWP/SB switching gap is defined. The new BWP/SB switching gap is smaller than some other BWP switching delays, such as a BWP switch delay which may be currently defined in the 3GPP NR specification. The new BWP/SB switching gap applies during preconfigured BWP/SB switches. In one aspect of the present disclosure, the new switching gap does not affect the rules for transmitting and receiving. In other words, the rules are the same as those defined for the current NR BWP switching.

The new switching delay can be UE reported as part of the UE capability. Alternatively, the base station can signal the new switching delay to all of its UEs. In another configuration, the new switching delay is specified in the standard and is not signaled.

According to further aspects of the present disclosure, the new switching delay is subcarrier spacing (SCS) dependent. Although hopping generally uses the same SCS, in preconfigured switching with varying SCS, the new switching delay is SCS dependent. The new switching delay can be based on either the new SCS (after the switch) or the prior SCS (before the switch).

In still other aspects of the present disclosure, the new switching delay is band dependent. For example, bands closer together may have a shorter retuning time (e.g., two slots). Bands spaced further apart may take longer to retune (e.g., four slots). Thus, the new switching delay can be set in accordance with the particular bands involved in the BWP/SB switch.

In yet another aspect, the new switching delay is the same regardless of the pre-configuration. For example, different preconfigured switching patterns will not affect the new switching delay. In alternative aspects, the new switching delay is dependent on the pre-configuration. For example, certain hopping patterns may be more difficult. In this example, the more difficult hopping pattern would be associated with a longer switching delay than an easier hopping pattern.

Figure 23:
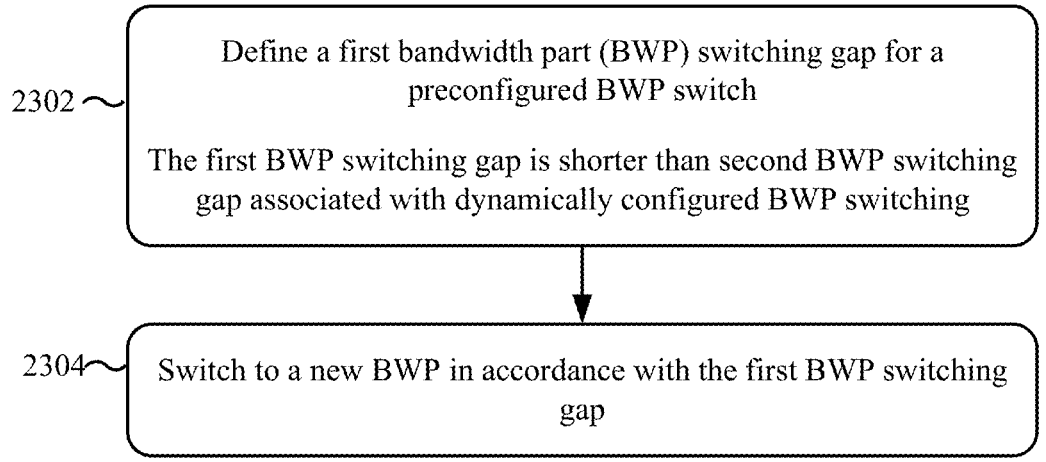
FIG. 23 illustrates an of a process that support grouping BWPs for efficient BWP switching in accordance with aspects of the present disclosure.

FIG. 23 illustrates an example of a process 2300 that supports grouping bandwidth parts for efficient bandwidth part switching in accordance with aspects of the present disclosure. The process 2300 may be implemented by one or more communication devices in accordance with various aspects of the present disclosure. The example process 2300 reduces switching time for preconfigured BWP/SB switching.

As shown in FIG. 23, in some aspects, the process 2300 may include defining a first BWP switching gap for a preconfigured BWP switch. The first BWP switching gap is shorter than a second BWP switching gap associated with dynamically configured BWP switching (block 2302). For example, the UE (e.g., using the antenna 2052, MOD/DEMOD 2054, TX MIMO processor 2066, transmit processor 2064, MIMO detector 2056, receive processor 2058, controller/processor 2080, memory 2082, and/or the like) or the base station (e.g., using the antenna 2034, MOD/DEMOD 2032, TX MIMO processor 2030, transmit processor 2020, MIMO detector 2036, receive processor 2038, controller/processor 2040, memory 2042, and/or the like) can define a shorter BWP switching gap.

As shown in FIG. 23, in some aspects, the process 2300 may include switching to a new BWP in accordance with the first BWP switching gap (block 2304). For example, the UE (e.g., using the antenna 2052, MOD/DEMOD 2054, TX MIMO processor 2066, transmit processor 2064, MIMO detector 2056, receive processor 2058, controller/processor 2080, memory 2082, and or the like) or the base station (e.g., using the antenna 2034, MOD/DEMOD 2032, TX MIMO processor 2030, transmit processor 2020, MIMO detector 2036, receive processor 2038, controller/processor 2040, memory 2042, and or the like) can switch to the new BWP.

The following provides an overview of aspects of the present disclosure:

Aspect 1: A method for wireless communications at a UE, comprising: identifying a configuration for a plurality of bandwidth part groups comprising an intra-group switching delay and an inter-group switching delay, wherein the intra-group switching delay is smaller than the inter-group switching delay; communicating with a base station on a first bandwidth part of a first bandwidth part group of the plurality of bandwidth part groups; switching to a second bandwidth part of the first bandwidth part group based at least in part on the intra-group switching delay or switching to a third bandwidth part of a second bandwidth part group of the plurality of bandwidth part groups based at least in part on the inter-group switching delay; and communicating with the base station on the second bandwidth part or the third bandwidth part based at least in part on the switching.

Aspect 2: The method of aspect 1, further comprising: transmitting a UE capability for bandwidth part switching to the base station.

Aspect 3: The method of aspect 2, further comprising: determining the first bandwidth part group and the second bandwidth part group based at least in part on the UE capability.

Aspect 4: The method of any of aspects 1 through 3, further comprising: receiving an indication of the intra-group switching delay from the base station.

Aspect 5: The method of aspect 4, further comprising: determining the first bandwidth part group and the second bandwidth part group based at least in part on the indication of the intra-group switching delay.

Aspect 6: The method of any of aspects 1 through 5, wherein the intra-group switching delay is based at least in part on a subcarrier spacing of the first bandwidth part group, a radio frequency spectrum band comprising the first bandwidth part group, or both.

Aspect 7: The method of any of aspects 1 through 6, wherein bandwidth parts of the first bandwidth part group are contiguous in frequency.

Aspect 8: The method of any of aspects 1 through 7, wherein bandwidth parts of the first bandwidth part group are non-contiguous in frequency.

Aspect 9: The method of any of aspects 1 through 8, wherein bandwidth parts of the first bandwidth part group are configured together by the base station.

Aspect 10: The method of any of aspects 1 through 9, further comprising: receiving a list of bandwidth parts from the base station; selecting a first set of bandwidth parts from the list of bandwidth parts for the first bandwidth part group and a second set of bandwidth parts from the list of bandwidth parts for the second bandwidth part group; and transmitting an indication of the selection for the first bandwidth part group and the second bandwidth part group to the base station.

Aspect 11: The method of any of aspects 1 through 10, wherein the first bandwidth part group comprises bandwidth parts in a first hop region; and the second bandwidth part group comprises bandwidth parts in a second hop region.

Aspect 12: The method of aspect 11, further comprising: identifying a fourth bandwidth part at least partially overlapping the first hop region and the second hop region.

Aspect 13: The method of aspect 12, further comprising: determining a bandwidth part group for the fourth bandwidth part based at least in part on a larger overlap with the first hop region or the second hop region.

Aspect 14: The method of any of aspects 12 through 13, further comprising: receiving, from the base station, an indication of whether the fourth bandwidth part is included in the first bandwidth part or the second bandwidth part group.

Aspect 15: The method of any of aspects 12 through 14, further comprising: determining the fourth bandwidth part is not included in a bandwidth part group based at least in part on partially overlapping the first hop region and the second hop region, wherein switching to the fourth bandwidth part is based at least in part on the inter-group switching delay.

Aspect 16: The method of any of aspects 1 through 15, further comprising: receiving signaling from the base station configuring a set of bandwidth parts of the first bandwidth part group, wherein the set of bandwidth parts are included in the first bandwidth part group based at least in part on the signaling.

Aspect 17: A method for wireless communication at a base station, comprising: identifying a configuration for a plurality of bandwidth part groups comprising an intra-group switching delay and an inter-group switching delay, wherein the intra-group switching delay is smaller than the inter-group switching delay; communicating with a UE on a first bandwidth part of a first bandwidth part group of the plurality of bandwidth part groups; switching to a second bandwidth part of the first bandwidth part group based at least in part on the intra-group switching delay or switching to a third bandwidth part of a second bandwidth part group of the plurality of bandwidth part groups based at least in part on the inter-group switching delay; and communicating with the UE on the second bandwidth part or the third bandwidth part based at least in part on the switching.

Aspect 18: The method of aspect 17, further comprising: receiving a UE capability for bandwidth part switching from the UE.

Aspect 19: The method of aspect 18, further comprising: determining the first bandwidth part group and the second bandwidth part group based at least in part on the UE capability.

Aspect 20: The method of any of aspects 17 through 19, further comprising: transmitting an indication of the intra-group switching delay to the UE.

Aspect 21: The method of aspect 20, further comprising: determining the first bandwidth part group and the second bandwidth part group based at least in part on the indication of the intra-group switching delay.

Aspect 22: The method of any of aspects 17 through 21, wherein the intra-group switching delay is based at least in part on a subcarrier spacing of the first bandwidth part group, a radio frequency spectrum band comprising the first bandwidth part group, or both.

Aspect 23: The method of any of aspects 17 through 22, wherein bandwidth parts of the first bandwidth part group are contiguous in frequency.

Aspect 24: The method of any of aspects 17 through 23, wherein bandwidth parts of the first bandwidth part group are non-contiguous in frequency.

Aspect 25: The method of any of aspects 17 through 24, further comprising: configuring a first set of bandwidth parts for the first bandwidth part group and a second set of bandwidth parts for the second bandwidth part group; and transmitting an indication of the configuration for the first bandwidth part group and the second bandwidth part group to the UE.

Aspect 26: The method of any of aspects 17 through 25, further comprising: transmitting a list of bandwidth parts from the base station; and receiving, from the UE, an indication of bandwidth parts selected from the list of bandwidth parts for the first bandwidth part group and the second bandwidth part group.

Aspect 27: The method of any of aspects 17 through 26, wherein the first bandwidth part group comprises bandwidth parts in a first hop region; and the second bandwidth part group comprises bandwidth parts in a second hop region.

Aspect 28: The method of aspect 27, further comprising: identifying a fourth bandwidth part at least partially overlapping the first hop region and the second hop region.

Aspect 29: The method of aspect 28, further comprising: determining a bandwidth part group for the fourth bandwidth part based at least in part on a larger overlap with the first hop region or the second hop region.

Aspect 30: The method of any of aspects 28 through 29, further comprising: transmitting, to the UE, an indication of whether the fourth bandwidth part is included in the first bandwidth part or the second bandwidth part group.

Aspect 31: The method of any of aspects 28 through 30, further comprising: determining the fourth bandwidth part is not included in a bandwidth part group based at least in part on partially overlapping the first hop region and the second hop region, wherein switching to the fourth bandwidth part is based at least in part on the inter-group switching delay.

Aspect 32: The method of any of aspects 17 through 31, further comprising: transmitting signaling to the UE configuring a set of bandwidth parts of the first bandwidth part group, wherein the set of bandwidth parts are included in the first bandwidth part group based at least in part on the signaling.

Aspect 33: A method of wireless communication by a communication device, comprising: defining a first bandwidth part (BWP) switching gap for a preconfigured BWP switch, the first BWP switching gap being shorter than a second BWP switching gap associated with dynamically configured BWP switching; and switching to a new BWP in accordance with the first BWP switching gap.

Aspect 34: The method of aspect 33, wherein the communication device comprises a UE and the defining comprises reporting by the UE.

Aspect 35: The method of any of aspects 33 through 34, wherein the communication device comprises a base station and the defining comprises signaling by the base station.

Aspect 36: The method of any of aspects 33 through 35, wherein the first BWP switching gap is based on a sub-carrier spacing.

Aspect 37: The method of any of aspects 33 through 36, wherein the first BWP switching gap is based on a frequency band.

Aspect 38: The method of any of aspects 33 through 37, wherein the first BWP switching gap is based on a pattern associated with the preconfigured BWP switch.

Aspect 39: The method of any of aspects 33 through 38, wherein the first BWP switching gap is not based on a pattern associated with the preconfigured BWP switch.

Aspect 40: The method of any of aspects 33 through 39, further comprising: communicating in accordance with rules defined for the second BWP switching gap.

Aspect 41: An apparatus for wireless communications at a UE, comprising at least one processor; memory coupled with the at least one processor; and instructions stored in the memory and executable by the at least one processor to cause the apparatus to perform a method of any of aspects 1 through 16.

Aspect 42: An apparatus for wireless communications at a UE, comprising at least one means for performing a method of any of aspects 1 through 16.

Aspect 43: A non-transitory computer-readable medium storing code for wireless communications at a UE, the code comprising instructions executable by a processor to perform a method of any of aspects 1 through 16.

Aspect 44: An apparatus for wireless communication at a base station, comprising at least one processor; memory coupled with the at least one processor; and instructions stored in the memory and executable by the at least one processor to cause the apparatus to perform a method of any of aspects 17 through 32.

Aspect 45: An apparatus for wireless communication at a base station, comprising at least one means for performing a method of any of aspects 17 through 32.

Aspect 46: A non-transitory computer-readable medium storing code for wireless communication at a base station, the code comprising instructions executable by a processor to perform a method of any of aspects 17 through 32.

Aspect 47: An apparatus comprising at least one processor; memory coupled with the at least one processor; and instructions stored in the memory and executable by the at least one processor to cause the apparatus to perform a method of any of aspects 33 through 40.

Aspect 48: An apparatus comprising at least one means for performing a method of any of aspects 33 through 40.

Aspect 49: A non-transitory computer-readable medium storing code the code comprising instructions executable by a processor to perform a method of any of aspects 33 through 40.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
one or more memories storing processor-executable code; and
one or more processors coupled with the one or more memories and individually or collectively operable to execute the code to cause the UE to:
receive an indication of an intra-group switching delay and an inter-group switching delay, wherein the intra-group switching delay is smaller than the inter-group switching delay;
identify a configuration for a plurality of bandwidth part groups comprising the intra-group switching delay and the inter-group switching delay;
communicate with a network device on a first bandwidth part of a first bandwidth part group of the plurality of bandwidth part groups;
switch to a second bandwidth part of the first bandwidth part group based at least in part on the intra-group switching delay or switching to a third bandwidth part of a second bandwidth part group of the plurality of bandwidth part groups based at least in part on the inter-group switching delay; and
communicate with the network device on the second bandwidth part or the third bandwidth part based at least in part on the switching.

2. The apparatus of claim 1, wherein the one or more processors are individually or collectively further operable to execute the code to cause the UE to:
transmit a UE capability for bandwidth part switching to the network device.

3. The apparatus of claim 2, wherein the one or more processors are individually or collectively further operable to execute the code to cause the UE to:
determine the first bandwidth part group and the second bandwidth part group based at least in part on the UE capability.

4. The apparatus of claim 1, wherein the one or more processors are individually or collectively further operable to execute the code to cause the UE to:
determine the first bandwidth part group and the second bandwidth part group based at least in part on the indication of the intra-group switching delay.

5. The apparatus of claim 1, wherein the intra-group switching delay is based at least in part on a subcarrier spacing of the first bandwidth part group, a radio frequency spectrum band comprising the first bandwidth part group, or both.

6. The apparatus of claim 1, wherein bandwidth parts of the first bandwidth part group are configured together by the network device.

7. The apparatus of claim 1, wherein the one or more processors are individually or collectively further operable to execute the code to cause the UE to:
receive a list of bandwidth parts;
select a first set of bandwidth parts from the list of bandwidth parts for the first bandwidth part group and a second set of bandwidth parts from the list of bandwidth parts for the second bandwidth part group; and
transmit an indication of the selection for the first bandwidth part group and the second bandwidth part group to the network device.

8. The apparatus of claim 1, wherein:
the first bandwidth part group comprises bandwidth parts in a first hop region; and
the second bandwidth part group comprises bandwidth parts in a second hop region.

9. The apparatus of claim 8, wherein the one or more processors are individually or collectively further operable to execute the code to cause the UE to:
identify a fourth bandwidth part at least partially overlapping the first hop region and the second hop region.

10. The apparatus of claim 9, wherein the one or more processors are individually or collectively further operable to execute the code to cause the UE to:
determine a bandwidth part group for the fourth bandwidth part based at least in part on a larger overlap with the first hop region or the second hop region.

11. The apparatus of claim 9, wherein the one or more processors are individually or collectively further operable to execute the code to cause the UE to:
receive an indication of whether the fourth bandwidth part is included in the first bandwidth part or the second bandwidth part group.

12. The apparatus of claim 9, wherein the one or more processors are individually or collectively further operable to execute the code to cause the UE to:
determine the fourth bandwidth part is not included in a bandwidth part group based at least in part on partially overlapping the first hop region and the second hop region, wherein switching to the fourth bandwidth part is based at least in part on the inter-group switching delay.

13. The apparatus of claim 1, wherein the one or more processors are individually or collectively further operable to execute the code to cause the UE to:
receive signaling configuring a set of bandwidth parts of the first bandwidth part group, wherein the set of bandwidth parts are included in the first bandwidth part group based at least in part on the signaling.

14. An apparatus for wireless communication at a network device, comprising:
one or more memories storing processor-executable code; and
one or more processors coupled with the one or more memories and individually or collectively operable to execute the code to cause the network device to:
transmit, to a user equipment (UE), an indication of an intra-group switching delay and an inter-group switching delay, wherein the intra-group switching delay is smaller than the inter-group switching delay;
identify a configuration for a plurality of bandwidth part groups comprising the intra-group switching delay and the inter-group switching delay;
communicate with the UE on a first bandwidth part of a first bandwidth part group of the plurality of bandwidth part groups;
switch to a second bandwidth part of the first bandwidth part group based at least in part on the intra-group switching delay or switch to a third bandwidth part of a second bandwidth part group of the plurality of bandwidth part groups based at least in part on the inter-group switching delay; and
communicate with the UE on the second bandwidth part or the third bandwidth part based at least in part on the switching.

15. The apparatus of claim 14, wherein the one or more processors are individually or collectively further operable to execute the code to cause the network device to:
receive a UE capability for bandwidth part switching from the UE.

16. The apparatus of claim 15, wherein the one or more processors are individually or collectively further operable to execute the code to cause the network device to:
determine the first bandwidth part group and the second bandwidth part group based at least in part on the UE capability.

17. The apparatus of claim 14, wherein the one or more processors are individually or collectively further operable to execute the code to cause the network device to:
determine the first bandwidth part group and the second bandwidth part group based at least in part on the indication of the intra-group switching delay.

18. The apparatus of claim 14, wherein the intra-group switching delay is based at least in part on a subcarrier spacing of the first bandwidth part group, a radio frequency spectrum band comprising the first bandwidth part group, or both.

19. The apparatus of claim 14, wherein the one or more processors are individually or collectively further operable to execute the code to cause the network device to:
configure a first set of bandwidth parts for the first bandwidth part group and a second set of bandwidth parts for the second bandwidth part group; and
transmit an indication of the configuration for the first bandwidth part group and the second bandwidth part group to the UE.

20. The apparatus of claim 14, wherein the one or more processors are individually or collectively further operable to execute the code to cause the network device to:

transmit a list of bandwidth parts; and receive, from the UE, an indication of bandwidth parts selected from the list of bandwidth parts for the first bandwidth part group and the second bandwidth part group.

21. The apparatus of claim 14, wherein:
the first bandwidth part group comprises bandwidth parts in a first hop region; and
the second bandwidth part group comprises bandwidth parts in a second hop region.

22. The apparatus of claim 21, wherein the one or more processors are individually or collectively further operable to execute the code to cause the network device to:
identify a fourth bandwidth part at least partially overlapping the first hop region and the second hop region.

23. The apparatus of claim 22, wherein the one or more processors are individually or collectively further operable to execute the code to cause the network device to:
determine a bandwidth part group for the fourth bandwidth part based at least in part on a larger overlap with the first hop region or the second hop region.

24. The apparatus of claim 22, wherein the one or more processors are individually or collectively further operable to execute the code to cause the network device to:
transmit, to the UE, an indication of whether the fourth bandwidth part is included in the first bandwidth part or the second bandwidth part group.

25. The apparatus of claim 22, wherein the one or more processors are individually or collectively further operable to execute the code to cause the network device to:
determine the fourth bandwidth part is not included in a bandwidth part group based at least in part on partially overlapping the first hop region and the second hop region, wherein switching to the fourth bandwidth part is based at least in part on the inter-group switching delay.

26. The apparatus of claim 14, wherein the one or more processors are individually or collectively further operable to execute the code to cause the network device to:
transmit signaling to the UE configuring a set of bandwidth parts of the first bandwidth part group, wherein the set of bandwidth parts are included in the first bandwidth part group based at least in part on the signaling.

27. A method for wireless communications at a user equipment (UE), comprising:
receiving an indication of an intra-group switching delay and an inter-group switching delay, wherein the intra-group switching delay is smaller than the inter-group switching delay;
identifying a configuration for a plurality of bandwidth part groups comprising the intra-group switching delay and the inter-group switching delay;
communicating with a network device on a first bandwidth part of a first bandwidth part group of the plurality of bandwidth part groups;
switching to a second bandwidth part of the first bandwidth part group based at least in part on the intra-group switching delay or switching to a third bandwidth part of a second bandwidth part group of the plurality of bandwidth part groups based at least in part on the inter-group switching delay; and
communicating with the network device on the second bandwidth part or the third bandwidth part based at least in part on the switching.

28. A method for wireless communication at a network device, comprising:
transmitting, to a user equipment (UE), an indication of an intra-group switching delay and an inter-group switching delay, wherein the intra-group switching delay is smaller than the inter-group switching delay;
identifying a configuration for a plurality of bandwidth part groups comprising the intra-group switching delay and the inter-group switching delay;
communicating with the UE on a first bandwidth part of a first bandwidth part group of the plurality of bandwidth part groups;
switching to a second bandwidth part of the first bandwidth part group based at least in part on the intra-group switching delay or switching to a third bandwidth part of a second bandwidth part group of the plurality of bandwidth part groups based at least in part on the inter-group switching delay; and
communicating with the UE on the second bandwidth part or the third bandwidth part based at least in part on the switching.

* * * * *